US012596379B2

(12) United States Patent
Lu et al.

(10) Patent No.: US 12,596,379 B2
(45) Date of Patent: Apr. 7, 2026

(54) RENDERING MISSION ACTIONS IN INDUSTRIAL ENVIRONMENT MAP

(71) Applicant: Yokogawa Electric Corporation, Tokyo (JP)

(72) Inventors: Brendon Lu, Sugar Land, TX (US); Sandra Fabiano, Sugar Land, TX (US)

(73) Assignee: Yokogawa Electric Corporation, Tokyo (JP)

( * ) Notice: Subject to any disclaimer, the term of this patent is extended or adjusted under 35 U.S.C. 154(b) by 159 days.

(21) Appl. No.: 18/587,603

(22) Filed: Feb. 26, 2024

(65) Prior Publication Data

US 2025/0271851 A1    Aug. 28, 2025

(51) Int. Cl.
G06F 3/0482 (2013.01)
G05D 1/224 (2024.01)

(52) U.S. Cl.
CPC ......... G05D 1/2246 (2024.01); G06F 3/0482 (2013.01)

(58) Field of Classification Search
CPC ...................... G06F 3/048–05; G05D 1/2246
See application file for complete search history.

(56) References Cited

U.S. PATENT DOCUMENTS

| | | | | |
|---|---|---|---|---|
| 8,195,333 | B2 * | 6/2012 | Ziegler | .................. B25J 19/023 318/568.25 |
| 8,952,983 | B2 | 2/2015 | Uusitalo et al. | |

| | | | | |
|---|---|---|---|---|
| 10,983,675 | B1 * | 4/2021 | Barbhaya | .............. G06F 3/0489 |
| 11,878,421 | B2 * | 1/2024 | Cao | ......................... G05D 1/246 |
| 2004/0167706 | A1 * | 8/2004 | Becker | .................. G01S 5/0009 701/467 |

(Continued)

FOREIGN PATENT DOCUMENTS

| | | |
|---|---|---|
| DE | 112022001224 | 4/2024 |
| EP | 3557358 | 10/2019 |

(Continued)

OTHER PUBLICATIONS

German Patent & Trademark Office; Office Action issued for Application No. 10 2025 102 545.2, 10 pages, dated Sep. 5, 2025.

(Continued)

*Primary Examiner* — Daniel Rodriguez
(74) *Attorney, Agent, or Firm* — Gray Ice Higdon

(57)    ABSTRACT

Implementations relate to rendering mission action(s) in dependence on metadata associated with mission actions for an industrial environment. The rendered mission action(s) can include a first mission action rendered in a first manner and a second mission action rendered in a second manner different from the first manner. For example, the first mission action can be rendered with first graphical features based on first metadata of the first mission action being in a first level of granularity (e.g., the first metadata specifying a robot pose and a camera pose). The second mission action can be rendered with second graphical features based on second metadata of the second mission action being in a second level of granularity (e.g., the second metadata specifying a robot pose but no camera pose). Additionally or alternatively, the one or more mission actions can be rendered based on user input, and/or can be rendered in response to detecting a particular object or event.

19 Claims, 11 Drawing Sheets

(56)        References Cited

U.S. PATENT DOCUMENTS

| | | | | |
|---|---|---|---|---|
| 2007/0277111 A1* | 11/2007 | Bennett | G06F 3/04812 | |
| | | | 715/763 | |
| 2009/0258656 A1* | 10/2009 | Wang | H04W 4/02 | |
| | | | 455/456.1 | |
| 2013/0174066 A1* | 7/2013 | Felix | G06F 9/451 | |
| | | | 715/763 | |
| 2016/0307447 A1* | 10/2016 | Johnson | B60L 58/12 | |
| 2018/0344116 A1* | 12/2018 | Schriesheim | A47L 9/2826 | |
| 2019/0049274 A1* | 2/2019 | Browning | G01D 11/30 | |
| 2019/0162546 A1* | 5/2019 | Duale | G01C 21/3438 | |
| 2020/0103881 A1* | 4/2020 | Halgren, III | G05D 1/0044 | |
| 2020/0150687 A1 | 5/2020 | Halder et al. | | |
| 2021/0018912 A1* | 1/2021 | Dymesich | G06F 3/0482 | |
| 2021/0381934 A1* | 12/2021 | Abdellatif | B64C 21/02 | |
| 2021/0382586 A1* | 12/2021 | Bielby | G06F 3/0482 | |
| 2022/0048646 A1* | 2/2022 | Mankowski | B64U 70/93 | |
| 2022/0147059 A1 | 5/2022 | Borne-Pons | | |
| 2022/0221297 A1* | 7/2022 | Rivers | G01C 21/3664 | |
| 2022/0250658 A1 | 8/2022 | Blonder et al. | | |
| 2023/0400860 A1* | 12/2023 | Shi | G01C 21/383 | |
| 2024/0152161 A1* | 5/2024 | Jensen | B25J 9/1664 | |
| 2024/0176361 A1* | 5/2024 | Tokuda | G05D 1/2246 | |
| 2024/0193218 A1* | 6/2024 | Gasiorek | G06T 19/006 | |
| 2024/0288278 A1* | 8/2024 | Bailey | G01C 21/203 | |
| 2025/0004474 A1* | 1/2025 | Ji | G05D 1/229 | |

FOREIGN PATENT DOCUMENTS

| | | |
|---|---|---|
| JP | 2017223666 | 12/2017 |
| JP | 2020530159 | 10/2020 |
| JP | 202189560 | 6/2021 |
| JP | 2023154576 | 10/2023 |
| WO | 2017169282 | 10/2017 |

OTHER PUBLICATIONS

Japan Patent Office; First Office Action issued for Application No. 2025-28124, 14 pages, dated Jan. 6, 2026.

* cited by examiner

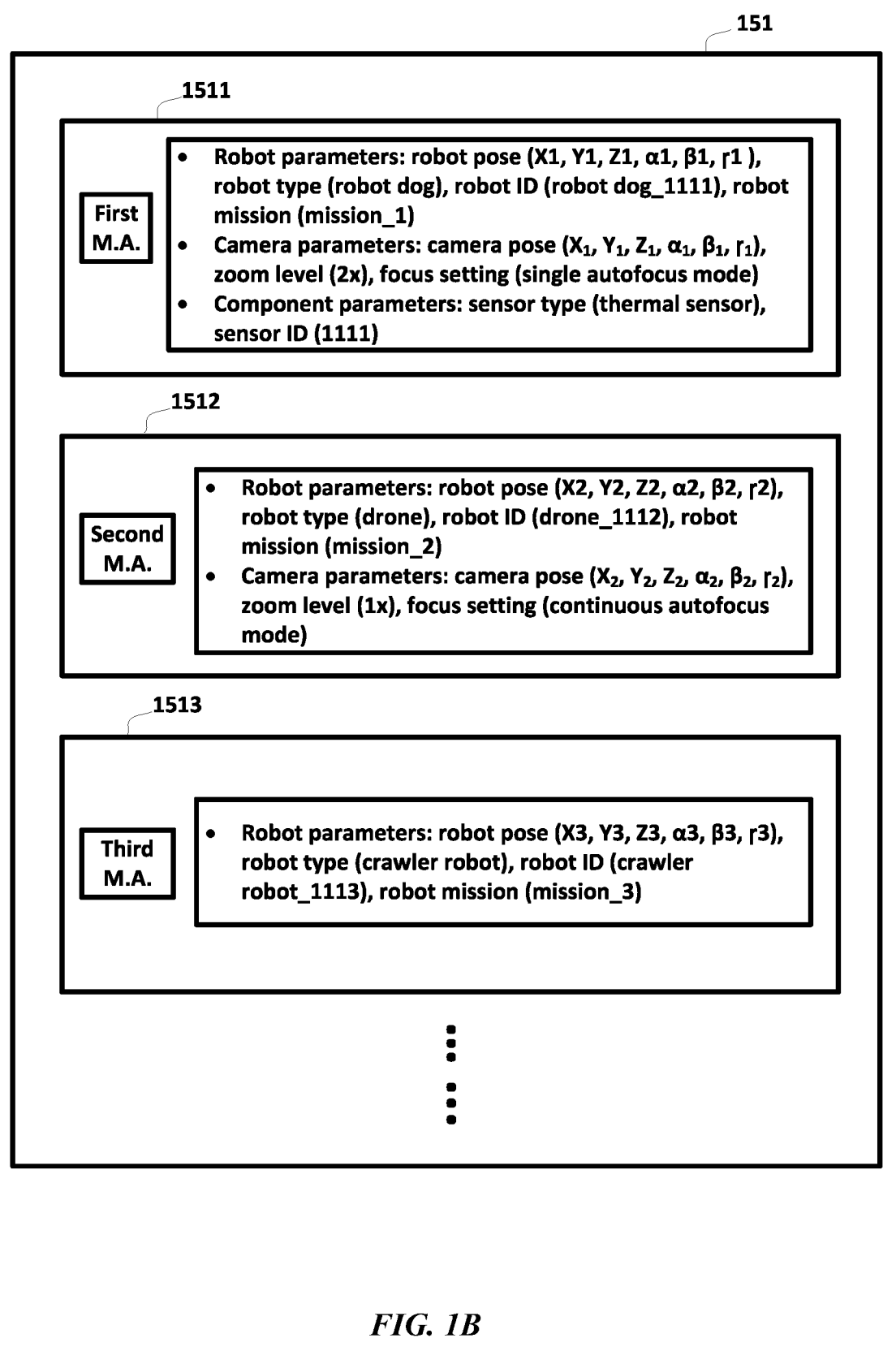

151

1511

First M.A.

- Robot parameters: robot pose (X1, Y1, Z1, α1, β1, Γ1 ), robot type (robot dog), robot ID (robot dog_1111), robot mission (mission_1)
- Camera parameters: camera pose $(X_1, Y_1, Z_1, α_1, β_1, Γ_1)$, zoom level (2x), focus setting (single autofocus mode)
- Component parameters: sensor type (thermal sensor), sensor ID (1111)

1512

Second M.A.

- Robot parameters: robot pose (X2, Y2, Z2, α2, β2, Γ2), robot type (drone), robot ID (drone_1112), robot mission (mission_2)
- Camera parameters: camera pose $(X_2, Y_2, Z_2, α_2, β_2, Γ_2)$, zoom level (1x), focus setting (continuous autofocus mode)

1513

Third M.A.

- Robot parameters: robot pose (X3, Y3, Z3, α3, β3, Γ3), robot type (crawler robot), robot ID (crawler robot_1113), robot mission (mission_3)

*FIG. 1B*

300

```
┌─────────────────────────────────────────────────┐
│  IDENTIFY CORRESPONDING METADATA FOR EACH OF A  │
│   PLURALITY OF MISSION ACTIONS FOR AN INDUSTRIAL │
│              ENVIRONMENT 302                     │
└─────────────────────────────────────────────────┘
                      │
                      ▼
┌─────────────────────────────────────────────────┐
│   RENDER, IN A MAP INTERFACE FOR THE INDUSTRIAL  │
│  ENVIRONMENT, A FIRST SUBSET OF THE MISSION ACTIONS WITH │
│        FIRST GRAPHICAL FEATURES 304              │
└─────────────────────────────────────────────────┘
                      │
                      ▼
┌─────────────────────────────────────────────────┐
│    RENDER, IN THE MAP INTERFACE FOR THE INDUSTRIAL │
│   ENVIRONMENT AND ALONG WITH THE FIRST SUBSET OF THE │
│  MISSION ACTIONS, A SECOND SUBSET OF THE MISSION ACTIONS │
│       WITH SECOND GRAPHICAL FEATURES 306         │
└─────────────────────────────────────────────────┘
                      │
                      ▼
┌─────────────────────────────────────────────────┐
│    RECEIVE A SELECTION, VIA THE MAP INTERFACE FOR THE │
│  INDUSTRIAL ENVIRONMENT, OF A GIVEN MISSION ACTION OF THE │
│      FIRST SUBSET OR THE SECOND SUBSET 308       │
└─────────────────────────────────────────────────┘
```

*FIG. 3*

400

IDENTIFY CORRESPONDING METADATA FOR EACH OF A PLURALITY OF MISSION ACTIONS FOR AN INDUSTRIAL ENVIRONMENT 402

DETERMINE, BASED ON USER INTERFACE INPUT AND/OR BASED ON A DETECTED EVENT IN THE INDUSTRIAL ENVIRONMENT, ONE OR MORE FILTERING CRITERIA 404

SELECT, FROM THE MISSION ACTIONS, A SUBSET OF THE MISSION ACTIONS, WHERE SELECTING THE SUBSET OF THE MISSION ACTIONS IS IN RESPONSE TO DETERMINING THAT THE CORRESPONDING METADATA, FOR EACH OF THE MISSION ACTIONSOF THE SUBSET, MATCH THE ONE OR MORE FILTERING CRITERIA 406

RENDER, IN A MAP INTERFACE FOR THE INDUSTRIAL FACILITY, THE SUBSET OF THE MISSION ACTIONS, WITHOUT RENDERING OTHER OF THE MISSION ACTIONS THAT ARE NOT OF THE SUBSET 408

RECEIVE A SELECTION, VIA THE MAP INTERFACE FOR THE INDUSTRIAL FACILITY, OF A GIVEN MISSION ACTION OF THE SUBSET 410

IN RESPONSE TO RECEIVING THE SELECTION, ADD THE GIVEN MISSION ACTION TO A PREDEFINED ROBOT MISSION OR INCLUDE THE GIVEN MISSION ACTION IN A NEW ROBOT MISSION 412

FIG. 4

RENDERING MISSION ACTIONS IN INDUSTRIAL ENVIRONMENT MAP

BACKGROUND

Multiple robots can be deployed in an industrial facility for various purposes, such as capturing images of gauges, taking gas readings, capturing images for anomaly detection, etc. For example, at a given time a first robot can be performing a first mission that involves a series of mission actions that each define a corresponding robot pose and a corresponding camera pose of a camera of the robot at which image(s) of point(s) of interest (POI(s)) can be captured. Accordingly, performing the first mission can involve implementing the series of mission actions which results in the robot navigating to various robot poses and capturing corresponding images at those poses (e.g., with the camera at a corresponding camera pose). At the given time a second robot can also be performing a second mission that involves a unique series of mission actions that each define a corresponding robot pose without also defining a camera pose (e.g., the second robot may lack any camera, but include gas sensor(s). Accordingly, performing the second mission can involve implementing the unique series of mission actions which results in the robot navigating to various robot poses and taking gas readings at those poses using gas sensor(s) and without regard to any camera pose.

A mission action can be initially defined by a human operator for a robot that is controlled (e.g., through use of a handheld controller and/or a computer interface) and specified by input(s) provided by the human operator. The robot can be a real robot controlled in an actual industrial facility, or a simulated robot controlled in a simulation of the actual industrial facility. For example, in defining a mission action a human can utilize a handheld controller to navigate a robot to a particular robot pose (e.g., location and orientation of the robot), adjust a camera of the robot to a particular camera pose (e.g., location and orientation of the camera) while the robot is at the particular robot pose, and provide a user interface input that defines the particular robot pose and the particular camera pose as metadata for the particular mission action. After the robot mission action is initially defined, the robot (or a different robot) can subsequently utilize the defined robot mission action to autonomously (i.e., without requiring any human operator control) implement the mission action (e.g. navigate to the robot pose and adjust the camera to the camera pose).

SUMMARY

As referenced above, robots in an industrial environment (e.g., including an industrial facility) can perform corresponding defined missions and, in doing so, can each implement a sequence of mission data defined for a respective mission. For example, a first robot can perform a first defined mission by implementing a first sequence of mission actions, and a second robot different from the first robot can perform a second defined mission by implementing a second sequence of mission actions. The first robot can be the same as, or different from the second robot. For example, the first robot can be different from the second robot in that the first and second robot are from different manufacturers, are of different types (e.g., quadruped, multiple wheels, self-balancing single wheel, crawler, aerial, etc.), and/or have different payloads (e.g., first robot includes a camera and/or gas sensor and second robot lacks any camera and/or gas sensor). The first defined mission can be the same as or different from the second defined mission.

In some implementations, different mission actions in the same sequence (e.g., the first or second sequence) can be defined with the same level of granularity. In some other implementations, different mission actions in the same sequence (e.g., the first or second sequence) can be defined with different levels of granularity. For instance, some mission action(s) can be defined more granularly (e.g., robot pose and camera parameter(s)) than are other mission action(s) (e.g., robot pose only). As a non-limiting example, the first sequence of mission actions can include a first mission action, a second mission action, and a third mission action, that are defined with different levels of granularity. In this non-limiting example: the first mission action can be defined with a first robot pose of the first robot but can lack any definition of a camera pose of a camera that is part of the payload of the first robot; the second mission action can be defined with a second robot pose of the first robot and a first camera pose of the camera when the first robot is at the second robot pose; and the third mission action can be defined with a third robot pose of the first robot, a second camera pose of the camera, as well as information of a POI (e.g., an ID of a component, a type of the component, etc.) that is captured by the camera at the second camera pose when the first robot is at the third robot pose. Accordingly, in this non-limiting example the third mission action can be defined with the greatest level of granularity (robot pose, camera pose, and POI information), the first mission action can be defined with the lowers level of granularity (robot pose only), and the second mission action can be defined with a level of granularity (robot pose and camera pose) that is between that of the first and second mission actions.

In some implementations, a mission action can optionally or additionally be defined with POI parameter(s) that define feature(s) of POI(s) that are captured by sensor reading(s) at the mission action. For example, a mission action (e.g., the second mission action) at which a robot (e.g., the first robot) captures an image of a particular gauge can be defined with a type of the particular gauge (e.g., temperature type, pressure type, etc.) and/or a unique identifier of the particular gauge (e.g., X1234AB). The feature(s) of the POI(s) that are defined for the mission action can be provided by an operator that is defining the mission action and/or can be determined automatically from analysis of image(s) and/or other vision data captured at the mission action.

In some implementations, different mission actions in different sequences (e.g., the first sequence and the second sequence) can be defined with the same level of granularity. In some other implementations, different mission actions in different sequences (e.g., the first sequence and the second sequence) can be defined with different levels of granularity. For example, a mission action in the first sequence can be for capturing an image of a gauge, and an additional mission action in the second sequence can be for taking a gas reading. In this example, the mission action can be defined with both: (a) a robot pose (e.g., X, Y, Z coordinate and optionally rotation and/or translation) of a robot, and/or other robot parameters of the robot (e.g., a robot type of the robot); and (b) camera parameter(s) such as a camera pose (e.g., rotation and/or translation), a camera zoom level, and/or a camera focus setting, of a camera that is used to capture the image of the gauge. The additional mission action can be defined with a robot pose (and sometimes only the robot pose) and without any camera parameter(s).

It is noted that certain mission action(s) may be defined and/or navigated to using a certain type of robot. In this case, these mission action(s) may not be defined with varying levels of granularities.

In some implementations, after being defined, a mission action can be stored in association with metadata that defines the mission action, for subsequent access (e.g., within the industrial environment). For instance, the defined mission action may be added by a human operator to a given mission (or a new mission) of a particular robot, to ensure the operation of the industrial facility within the industrial environment. It is noted that different mission actions can be defined and stored with metadata having different levels of granularity, or the same mission action can be defined and stored with metadata having varying levels of granularity that varies in association with different robots.

Although a mission (e.g., the aforementioned first defined mission or second defined mission) can remain static over time, there can be situations where it is desirable to at least temporarily add a given mission action to a given mission (where the given mission did not previously include the given mission action). For example, the given mission can include mission actions A-K, but not mission action L (although mission action L is defined in an alternate mission), but there can be a desire to add mission action L to the given mission. For instance, there can be a desire to add mission action L to the given mission if there is a potentially hazardous condition near mission action L, if there is a potential issue with a gauge associated with mission action L, etc.

There can also be situations where it is desirable to create a new mission that includes a new collection of pre-defined mission action(s) from one or more predefined mission(s). For example, if there is a potential spill or other issue in a given area of an industrial facility, there can be a desire to create a new mission that includes mission actions (e.g., pre-defined) in or near that area. Such mission actions can include two from a first mission, two from a second mission, and one from a third mission.

Existing techniques can inhibit or prevent adding a given mission action to a given mission and/or inhibit or prevent creating a new mission that includes a new collection of pre-defined mission action(s) from other missions. For example, existing techniques may not overlay mission actions on a map of the industrial environment, making it difficult and/or time consuming for a human operator to identify a mission action that might pertain to an area of the industrial environment. As another example, any overlay of mission actions on a map, or other graphical representation of the mission actions, may not indicate the granularity with which the mission actions are defined, thereby making it difficult and/or time consuming for a human operator to identify a mission action that might be relevant. For instance, it may not be possible to differentiate between a mission action that is defined with a robot pose only and a mission action that is defined with both a robot pose and camera parameter(s). Also, for instance, it may not be possible to quickly ascertain mission actions that pertain to particular type(s) of sensors (e.g., identify mission actions that pertain to temperature sensors).

Implementations disclosed herein can overlay mission actions on a map of an industrial environment, such as a bird's eye view/overhead map of the industrial environment. Some of those implementations can further render the mission actions in dependence on metadata of the mission actions. The mission actions can be rendered, for instance, in dependence on granularity with which each of the mission actions is defined (as reflected by metadata of the mission actions). For example, mission actions that are defined with only a robot pose (and/or other robot parameters) can be rendered in a unique manner relative to mission actions that are defined with both robot poses (and/or other robot parameters) and camera parameters. As another example, mission actions that pertain to pressure sensor readings can be rendered in a unique manner relative to mission actions that pertain to temperature sensor readings, and both can be rendered in a unique manner relative to mission actions that pertain to gas sensor readings.

As a particular example, mission actions that are defined with only a robot pose can be rendered on an industrial environment map in a first manner (e.g., without any image or descriptor of any gauge or other industrial POI, if no gauge or other industrial POI is associated with these mission actions), and mission actions that are defined with a robot pose and camera parameter(s) can be rendered on the industrial environment map in a second manner (e.g., with image(s) and/or descriptor(s) of gauge(s) and/or other POI(s) captured at the mission action). This can enable a human operator to more quickly ascertain a mission action to add to a given mission or to include in a new mission. For example, if the mission action is to be added to collect an additional gas reading or an additional panoramic image, then camera parameter(s) are not important, and the operator can choose from any of the rendered mission actions. On the other hand, if the mission action is to be added to collect an additional gauge reading or an additional image of a particular POI (or particular type of POI), the operator can focus their attention on mission actions defined with camera parameter(s).

In some implementations, additionally or alternatively, which mission actions are rendered at a given time can be selected based on user input(s) (e.g., selection of a filter element, or defining a region to limit showing of mission actions within the region, etc.). For instance, only a subset of mission actions can be rendered at the given time (e.g., over an industrial environment map) based on user input(s) that specify feature(s) of the subset of mission actions.

As a particular example, an operator can select a filter element to cause all mission actions to be shown. On the other hand, an operator can select an alternative filter element to cause only mission actions defined (e.g., as reflected in their corresponding metadata) with camera parameter(s) and/or associated with only certain types of POI(s) (e.g., gauges) to be shown. For example, in response to a cooling system operating sub optimally, an operator can select filter element(s) to cause rendering of only mission actions that (i) are defined with a camera pose; and (ii) are associated with temperature gauge(s). This can enable the operator to quickly select, from such rendered mission actions, one or more of the mission actions to add to a given mission or to include in a new mission (e.g., to inspect the cooling system).

In some implementations, additionally or alternatively, which mission actions are rendered at a given time can be selected based on detecting certain event(s). For instance, only a subset of mission actions can be rendered (e.g., over an industrial environment map) at the given time based on detecting a certain event and based on determining that the certain event pertains to the feature(s) of the subset of mission actions. As a non-limiting example, in response to detecting an oil spill (or other event) on a floor of an open space within an industrial environment, mission actions within the open space can be rendered, but not other mission actions in other space(s) of the industrial environment. In this non-limiting example, mission actions defined with different levels of granularities can be rendered in different manners.

Continuing with the above non-limiting example, in some implementations, not all mission actions within the open space are rendered. For instance, a subset of the mission actions within the open space that are each defined with camera parameters may be selectively rendered, so that a human operator may select a particular mission action from the rendered subset of the mission actions, so that a robot can navigate to the particular mission action to capture one or more camera images of the oil spill, for further analysis or before taking another action. It is noted that, in this case, mission actions defined with different levels of granularities can also be rendered in different manners, to ease the selection by the human operator.

In some implementations, a subset of mission actions can be rendered automatically (e.g., without user input) at a given time and over an industrial environment map, in response to detecting a certain event. For instance, a detection of a potential gas leak can automatically cause all mission actions for an industrial environment to be shown (since any of the mission actions can be used to take a gas reading). As another example, if the detection of a potential gas leak includes location information specifying an area (or a target location), a portion of all mission actions within the specified area (or within a predetermined distance from the target location) can be rendered automatically in response to the detection of the potential gas leak with the location information. In these implementations, optionally, the rendered mission actions can be automatically rendered in different manners, e.g., based on metadata of the rendered mission actions that defines these mission actions in different levels of granularity.

Accordingly, implementations disclosed herein render mission action(s), of an industrial facility, in a map of the industrial facility and in dependence on metadata associated with the mission actions. This can enable a human operator to identify, with reduced latency and/or a reduced quantity of user inputs, mission action(s) for adding to a given mission and/or for including in a new mission.

In various implementations, a method implemented using one or more processors is provided and includes identifying metadata for each of a plurality of mission action for an industrial environment. The industrial environment can be, or can include, an industrial facility. The industrial facility may take the form of a chemical processing plant, an industrial office environment, an oil or natural gas refinery, a catalyst factory, a manufacturing facility, an offshore oil platform, or any other applicable facility. The metadata for each of the plurality of mission actions, for instance, can be identified from a storage or database (e.g., accessible by operator(s) of the industrial environment) that stores metadata defined for all available mission actions for the industrial environment.

A mission action) for the industrial environment can, for instance, be initially defined by a human operator that controls a robot (e.g., through use of a handheld controller and/or a computer interface) and that provides input(s) to specify the mission action. The input(s), for instance, can provide a robot pose of the robot when capturing an image at the mission action and/or other robot parameters (e.g., robot type, robot model, robot manufacturer, etc.). The input(s), for instance, can further provide camera parameters (e.g., a camera pose, a zoom level, etc.) of a camera used by the robot to capture the image at the mission action. Additionally or alternatively, the input(s), for instance, can provide POI parameter(s) of a POI captured in the image, where the POI can be an industrial POI (e.g., a gauge) fixed or installed near the mission action.

In some implementations, the robot can be a real robot, and the industrial facility can be an actual industrial facility. In some implementations, the robot can be a simulated robot that is controlled in a simulation of the actual industrial facility. In some implementations, the real robot or the simulated robot can be controlled to navigate to the mission action, and/or perform one or more actions at the mission action.

In some implementations, metadata of a sequence of mission actions for a robot to perform a mission (e.g., detecting gas leakage for an environment surrounding each of the sequence of mission actions) can be stored in association with the mission and/or in association with the robot. For example, metadata of a first sequence of mission actions for a first robot to perform a first mission can be stored in a database in association with the first mission, and metadata of a second sequence of mission actions for a second robot to perform a second mission can be stored in the database in association with the second mission.

In some implementations, metadata of the sequence of mission actions can be generated or derived from the aforementioned input(s) from the human operator. In some other implementations, metadata of a particular mission action can be generated or derived from the aforementioned input(s) from the human operator. In some implementations, metadata of the particular mission action can be additionally or alternatively identified or collected, for instance, at least partly based on communications with the robot that captures the image of the mission action, e.g., by retrieving a robot pose of the robot (and/or a camera pose of a camera used by the robot to capture images) from the robot when the robot captures an image of the mission action.

In some implementations, metadata of a mission action can include a robot pose (for a robot) associated with the mission action. In some implementations, additionally or alternatively, the metadata of the mission action can include one or more camera parameters for a camera of the robot used to capture images at the mission action. For instance, if a human operator controls a robot to the mission action and controls a camera of the robot to capture an image of a gauge observable by the robot at the mission action, the metadata of the mission action can include camera parameters of the camera. The one or more camera parameters for the camera of the robot (e.g., to be navigated to the mission action) can include, for instance, a camera pose, a zoom level, and/or a focus.

In some implementations, instead of or in addition to a camera (or more than one camera), the robot can include or carry one or more other sensors (e.g., infrared sensor, etc.). In this case, the metadata of the mission action can alternatively or additionally include one or more sensor parameters of the one or more other sensors carried by the robot. In some implementations, additionally or alternatively, the metadata of a mission action can include one or more POI parameters for a POI (or more than one POI) sensed (e.g., previously sensed or to be sensed) by the robot at the mission action. The one or more POI parameters, for instance, can include a type (e.g., sensor) of the POI (e.g., an industrial pressure gauge connected to a pipe or tank at the mission action) and/or an identifier (e.g., G-10012) of the POI.

In various implementations, the method can further include, rendering, in a map interface for the industrial environment, a first subset of the mission actions with first graphical features. The map interface can be, for instance, a two-dimensional view (e.g., birds eye view/overhead) of the industrial environment. The first graphical features, as a non-limiting example, can include a first graphical symbol representing a first mission action (from the first subset) in the map interface. The first graphical symbol, for instance, can have a particular shape, color, pattern and/or other characteristics, indicating that the first mission action belongs to the first subset of the mission actions. In some implementations, rendering the first subset of the mission actions with the first graphical features is in response to determining that the corresponding metadata, for each of the mission actions of the first subset, matches one or more first criteria.

In various implementations, additionally or alternatively, the method can further include rendering, in the map interface for the industrial environment and along with the first subset of the mission actions, a second subset of the mission actions with second graphical features. The second graphical features, as a non-limiting example, can include a second graphical symbol representing a second mission action from the second subset. The second graphical symbol, for instance, can have a particular shape, color, pattern and/or other characteristics, indicating that the second mission action belongs to the first subset of the mission actions. In some implementations, rendering the second subset of the mission actions with the second graphical features is in response to determining that the corresponding metadata, for each of the mission actions of the second subset, matches one or more second criteria. The first criteria are distinct from the second criteria. The first graphical features are visually distinct from the second graphical features.

In some implementations, determining that the corresponding metadata, for each of the mission actions of the first subset, match the one or more first criteria can be realized/implemented by determining that the corresponding metadata for each of the mission actions of the first subset includes: a robot pose for a respective mission action from the first subset (so that a robot can navigate to the robot pose for approaching/imaging the respective mission action) and includes one or more vision sensor parameters for capturing vision data of the respective mission action while (the robot is) at the corresponding robot pose. In some implementations, the mission actions of the first subset can be associated with a hazardous object (or other object or industrial POI) to be imaged.

In some implementations, the one or more vision sensor parameters include a vision sensor pose, a vision sensor zoom level, and/or a vision sensor focus parameter associated with a vision sensor carried by the robot (e.g., a mobile robot) within the industrial environment. In some implementations, additionally or alternatively, metadata of the mission actions of the first subset includes one or more POI parameters for a POI sensed (e.g., by a robot) at one of the mission actions of the first subset. The one or more POI parameters can include, for instance, a POI identifier (and/or a type) of the POI.

In some implementations, determining that the corresponding metadata, for each of the mission actions of the second subset, match the one or more second criteria is implemented by determining that the corresponding metadata for each of the mission actions of the second subset includes a robot pose for a respective mission action from the second subset, but lacks any camera parameters for capturing an image of the mission action. In these implementations, determining that the corresponding metadata, for each of the mission actions of the second subset, match the one or more second criteria can include, or be implemented by, determining that the corresponding metadata for each of the mission actions of the second subset includes only a corresponding robot pose for each of the mission actions of the second subset. In some implementations, the mission actions of the second subset can each be a location where no image is captured (e.g., as a human operator has not defined these mission actions with camera pose(s)).

In some implementations, determining that the corresponding metadata, for each of the mission actions of the first subset, match the one or more first criteria includes, or is implemented by, determining that the corresponding metadata for each of the mission actions of the first subset indicates that the mission actions of the first subset each include a sensor of a first type. In some implementations, determining that the corresponding metadata, for each of the mission actions of the second subset, match the one or more second criteria includes, or is implemented by, determining that the corresponding metadata for each of the mission actions of the second subset indicates that the mission actions of the second subset each include a sensor of a second type. The second type may be different from the first type.

In various implementations, the method can further include, receiving a selection, via the map interface for the industrial environment, of a given mission action of the first subset or the second subset. The selection can be in the form of a touch input, an audio input, or any other applicable form, from a user (e.g., human operator). In some implementations, the first subset of the mission actions and/or the second subset of the mission actions can each be rendered as a graphical user interface (GUI) selectable element, for selection (e.g., a mouse click of the given mission action) by the user. For instance, the first subset of the mission actions can each be rendered as a first GUI selectable element, and the second subset of the mission actions can each be rendered as a second GUI selectable element, where the second GUI selectable element is visually distinguishable from the first GUI selectable element.

In various implementations, the method can further include, in response to receiving the selection, adding the given mission action to a predefined robot mission or including the given mission action in a new robot mission. As a non-limiting example, the predefined robot mission can include navigating a robot to a first mission action for capturing a first image at the first mission action, and further navigating the robot to a second mission action for capturing a second image at the second mission action. In this non-limiting example, the given mission action can be located between the first mission action and the second mission action, and adding the given mission action to the predefined robot mission can cause the robot to navigate to the given mission action for capturing an image at the given mission action, subsequent to navigating to the first mission action and prior to navigating to the second mission action.

Alternatively, the given mission action may be prioritized over the first and second mission actions, for instance, when a hazardous object is detected near (e.g., within a predefined range) the given mission action while routine inspections are needed at the first and second mission actions. In this case, adding the given mission action to the predefined robot mission can cause the robot to navigate to the given mission action for capturing an image of the given mission action, prior to navigating to the first and second mission actions. Alternatively, the first and second mission actions may be prioritized over the given mission action, for instance, when the first and second mission actions need immediate inspection while the given mission action needs routine inspection. In this case, adding the given mission action to the predefined robot mission can cause the robot to navigate to the given mission action for capturing an image of the given mission action, subsequent to navigating to the first and second mission actions.

Put another way, the given mission action may be added to the predefined robot mission based on a location of the given mission action with respect to locations of other predefined mission actions (e.g., the first mission action and the second mission action in the above non-limiting example) of the predefined robot mission, and/or based on a priority level of task(s) at the given mission action (e.g., with respect to priority levels of tasks at other predefined mission actions of the predefined robot mission).

In various implementations, a method implemented using one or more processors is provided and includes identifying corresponding metadata for each of a plurality of mission action for an industrial environment. In some implementations, the industrial environment can be, or can include, an industrial facility. The industrial facility may take the form of a chemical processing plant, an industrial office environment, an oil or natural gas refinery, a catalyst factory, a manufacturing facility, an offshore oil platform, or any other applicable facility. The metadata for each of the plurality of mission actions, for instance, can be stored in a storage or database (e.g., accessible by operator(s) of the industrial environment) after being defined, so that the metadata or a portion thereof can be identified or retrieved for subsequent use (e.g., for selecting one or more mission actions to be rendered, for rendering different mission actions in different manners, etc.).

In some implementations, identifying the corresponding metadata for each of the plurality of mission actions can be performed in response to a map interface of an industrial environment map being launched and rendered via a display of a computing device. The computing device can be, for instance, a local device within the industrial environment, or a server device in communication with the industrial environment. The plurality of mission actions can be (but does not necessarily need to be) rendered in response to the map interface being rendered. For instance, a portion of the plurality of mission actions can be rendered at the map interface using techniques/method described herein.

In various implementations, the method further includes, determining, based on user interface input and/or based on a detected event in the industrial environment, one or more filtering criteria. The one or more filtering criteria, for instance, can be rule(s) filtering the plurality of mission actions for rendering at an industrial environment map.

As an example, the user interface input can specify that the metadata of a mission action (to be rendered) needs to include a camera pose. In this example, a first filtering rule/criteria can be determined as to filter out mission action(s) that are not defined with any camera pose from being rendered on the industrial environment map. As another example, the detected event can be a detected abnormal reading of a temperature gauge for a cooling system within the industrial environment. In this example, a second filtering rule/criteria can be determined as to filter out mission action(s) that are not defined with any camera pose (which are necessary to take images of the cooling system) and that are not in association with temperature gauge(s). For instance, a mission action stored with metadata that includes no camera pose for imaging the temperature gauge (sometimes for imaging the temperature gauge for the cooling system, in particular) and that includes no gauge information of a temperature gauge can be filtered out using the second filtering criteria, so that such mission action will not be rendered on the industrial environment map. This not only reduces the total number of mission actions rendered for user selection thus making the selection easier, but also reduces the computing resources and other resources (battery, network, etc.) for the industrial environment.

In various implementations, the method further includes selecting, from the plurality of mission actions, a subset of the mission actions. In some implementations, selecting the subset of the mission actions is in response to determining that the corresponding metadata, for each of the mission actions of the subset, matches the one or more filtering criteria. As a non-limiting example, the one or more filtering criteria may include a first filtering rule that requires a rendered mission action to have metadata indicating a particular type of sensor (e.g., a pressure sensor) placed relative to the rendered mission action. In this non-limiting example, the subset of the mission actions selected can include and only include: a first mission action having metadata indicating that a first pressure sensor is observable at the first mission action, and a second mission action having metadata indicating that a second pressure sensor is observable at the second mission action. In other words, in this non-limiting example, any mission action from the plurality of mission actions whose metadata indicates that no pressure sensor is observable at a corresponding mission action may not be selected (e.g., for rendering).

As another non-limiting example, the corresponding metadata for each of the plurality of mission actions includes a corresponding robot pose of a respective robot at a corresponding mission action, and determining the filtering criteria includes determining one or more pose-based filtering criteria. The one or more pose-based filtering criteria can include a first pose-based filtering rule that requires selecting the subset of the mission actions that are each within a predetermined distance from a target location. The target location can be, for instance, a location selected by a user or a location at which an event of interest (e.g., oil spill) is detected.

In various implementations, the method further includes, rendering, in a map interface for the industrial facility, the subset of the mission actions without rendering other mission actions that are not of the subset. In some implementations, rendering the subset of the mission actions can include, rendering a graphical representation for each mission action of the subset. In some implementations, for each mission action of the subset, the graphical representation can include a selectable element which, when selected, causes metadata (or a portion thereof, e.g., an ID of the pressure sensor) associated with a corresponding mission action to be rendered (e.g., as an overlay on the map interface). In some implementations, alternatively or additionally, for each mission action of the subset, the graphical representation can be, or can include an additional selectable element which, when selected, causes the corresponding mission action to be added to a given mission or a new mission, of a robot. In some implementations, a user may be able to drag a symbol (e.g., the graphical representation) that represents the corresponding mission action, to add to a robot mission (e.g., the given mission or the new mission)

In various implementations, the method further includes, receiving a selection, via the map interface for the industrial facility, of a given mission action of the subset. Continuing with the above non-limiting example where the subset of the mission actions include (and only include) the first mission action (having metadata indicating that the first pressure sensor is accessible/observable at the first mission action) and the second mission action (having metadata indicating that the second pressure sensor is accessible/observable at the second mission action), the metadata of the first and second mission actions can include a first pressure reading received from the first pressure sensor and a second pressure reading received from the second pressure sensor. In this non-limiting example, the first pressure reading may be abnormal (e.g., higher than a normal range) and the second pressure reading may be within a normal range. In this case, the first mission action may be selected via the map interface as the given mission action that needs observation (e.g., image-capturing), while the second mission action is not selected. The first mission action may be selected by a user viewing the map interface, via a touch input, audio input, or a mouse click, or any other applicable type of input.

In various implementations, the method further includes, in response to receiving the selection, adding the given mission action to a predefined robot mission or including the given mission action in a new robot mission. For instance, the new robot mission can include navigating a robot of a particular type to the given mission action. In this case, the method can further include, causing the robot of the particular type to perform the new robot mission, which includes: navigating to the given mission action.

In various implementations, a method implemented by one or more processors is provided, and the method includes: identifying corresponding metadata for each of a plurality of mission actions of an industrial environment, where the metadata for each of the plurality of mission actions includes at least a robot pose for a robot at a corresponding mission action; detecting an object or event to be inspected within the industrial environment; in response to detecting the object or event, rendering, in a map interface for the industrial environment, a first mission action and a second mission action, where rendering the first and second mission actions is in response to determining that the first and second mission actions are within a predetermined distance with respect to a location of the object or event, and where the first mission action and the second mission action are rendered with different graphical features based on metadata of the first mission action and the second mission action having different levels of granularities; receiving a selection, via the map interface for the industrial facility, of the first mission action or the second mission action; and in response to receiving the selection, adding the first or second mission action to a robot mission.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 1B depicts example storage of metadata associated with one or more mission actions, in accordance with various implementations.

FIG. 3 illustrates an example method for performing selected aspects of the present disclosure, in accordance with various implementations.

FIG. 4 illustrates another example method for performing selected aspects of the present disclosure, in accordance with various implementations.

DETAILED DESCRIPTION

Figure 1A:
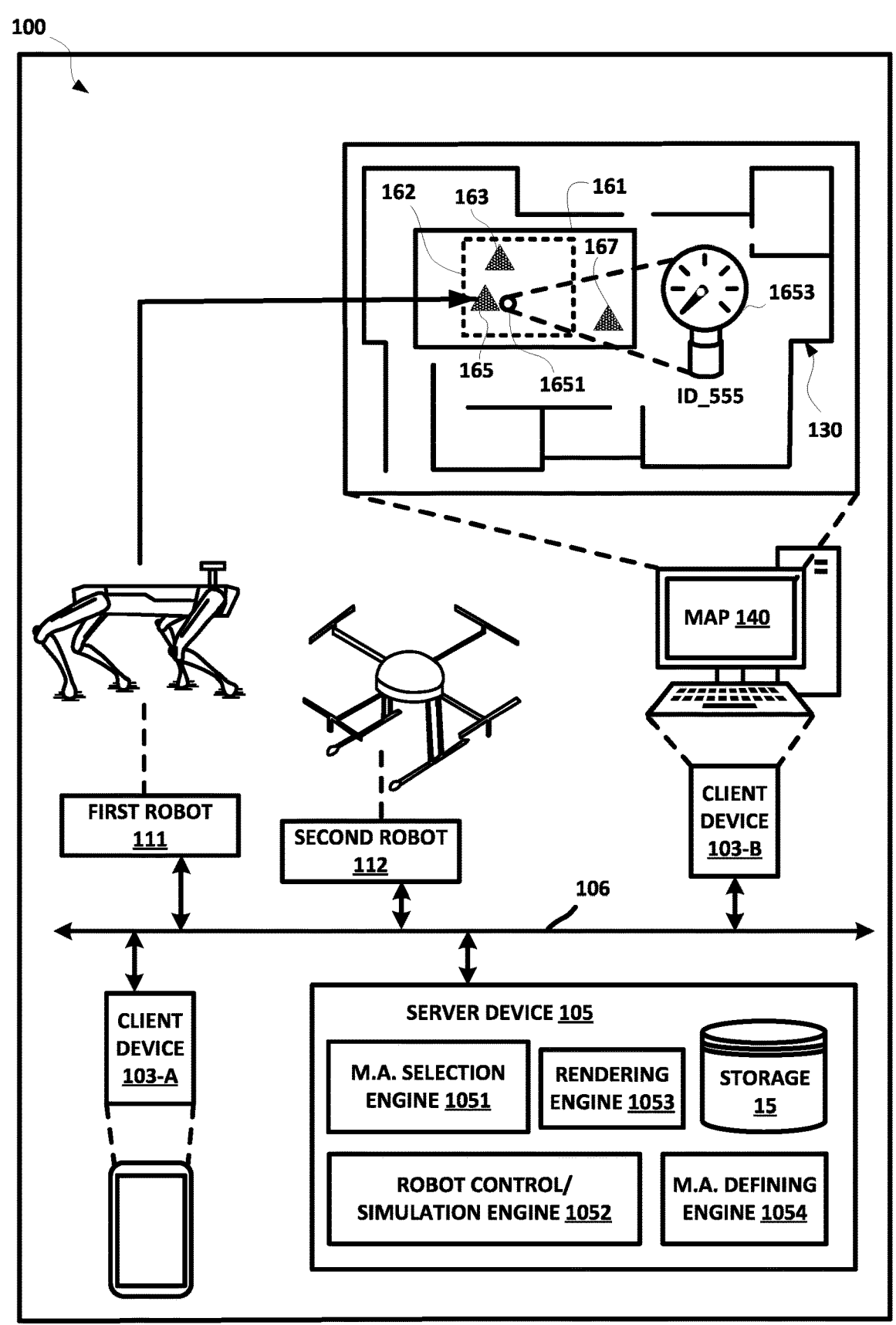
FIG. 1A schematically depicts an example environment in which selected aspects of the present disclosure can be implemented, in accordance with various implementations.

Implementations described herein pertain to rendering one or more mission actions on a map of an industrial environment. Some of the implementations can further render the mission actions in dependence on granularity with which the mission action is defined (as reflected by metadata of the mission actions). For example, mission actions that are defined with only a robot pose can be rendered in a unique manner relative to mission actions that are defined with both robot poses and camera parameters. As another example, mission actions that pertain to pressure sensor readings can be rendered in a unique manner relative to mission actions that pertain to temperature sensor readings, and both can be rendered in a unique manner relative to mission actions that pertain to gas sensor readings.

As yet another example, at a given time, mission actions can be selectively rendered based on user input(s) (e.g., selection of a filter element) and/or based on detecting certain event(s). For instance, only a subset of mission actions can be rendered at the given time based on user input(s) that specify feature(s) of the subset of mission actions, and/or based on detecting a certain event (e.g., triggered alarm) and determining that the detected certain event pertains to the feature(s) of the subset of mission actions. As a particular example, mission actions that are defined with a robot pose only can be rendered on an industrial environment map in a first manner and mission actions that are defined with a robot pose and camera parameter(s) can be rendered on the map in a second manner (e.g., w/image(s) and/or descriptor(s) of gauge(s) and/or other POI(s) captured at the mission action). This can enable a human operator to more quickly ascertain a mission action to add to a given mission or to include in a new mission. For example, if the mission action is to be added to collect an additional gas reading or an additional panoramic image, then camera parameter(s) are not important, and the operator can choose from any of the rendered mission actions. On the other hand, if the mission action is to be added to collect an additional gauge reading or an additional image of a particular POI (or particular type of POI), the operator can focus their attention on mission actions with camera parameter(s).

As another particular example, an operator can select a filter element to cause all mission actions to be shown, or detection of a potential gas leak can automatically cause all mission actions to be shown (since any of the mission actions can be used to take a gas reading). On the other hand, an operator can select an alternative filter element to cause only mission actions with camera parameter(s) and/or associated with only certain types of POI(s) (e.g., gauges) to be shown, or detection of a certain event can automatically cause such mission actions to be shown. For example, in response to a cooling system operating sub optimally, an operator can select filter element(s) to cause rendering of only mission actions that (i) define a camera pose; and (ii) are associated with temperature gauge(s). This can enable the operator to quickly select, from such mission actions, one or more of the mission actions to add to a given mission or to include in a new mission.

Accordingly, implementations disclosed herein render mission action(s), of an industrial facility, in a map of the industrial facility and in dependence on metadata associated with the mission actions. This can enable a human operator to identify, with reduced latency and/or a reduced quantity of user inputs, mission action(s) for adding to a given mission and/or for including in a new mission.

FIG. 1A schematically depicts an example environment in which selected aspects of the present disclosure may be implemented, in accordance with various implementations. Referring now to FIG. 1A, an example environment 100 in which various aspects of the present disclosure may be implemented is depicted schematically. The example environment 100 may be, or may include, an industrial facility 130, which may take numerous forms. For instance, the example environment 100 may be designed to implement any number of at least partially automated processes. The industrial facility 130 may take the form of a chemical processing plant, an industrial office environment, an oil or natural gas refinery, a catalyst factory, a manufacturing facility, an offshore oil platform, or any other applicable facility.

The example environment 100 may include one or more client devices (e.g., local client devices 103-A and 103-B) operably coupled with a process automation network 106 in the industrial facility. The client device 103-A or 103-B may be implemented as a computer (e.g., laptop, desktop, notebook), a tablet, a robot, a smart appliance (e.g., smart phone), a messaging device, a wearable device (e.g., watch), or any other applicable device. The process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh).

The example environment 100 may further include one or more mobile robots. For instance, the example environment 100 may include a robot fleet having a first robot 111, and/or a second robot 112. The first robot 111 can be the same as, or different from, the second robot 112. The first robot 111 may be, for instance, a quadruped robot (e.g., a robot dog), a wheeled robot, an unmanned aerial vehicle (e.g., a drone), a crawler robot, or any other applicable robot movable within or around the industrial facility 130. Different robots may be of different types and may be manufactured by different manufacturers. In some implementations, the robot fleet may include a subset of robots of the same type and/or manufactured by the same manufacturer.

As a non-limiting example, referring to FIG. 1A, the first robot 111 can be a robot dog that navigates to one or more mission action for the industrial facility 130, to inspect one or more POIs at, or near, the one or more mission actions. The second robot 112 can be a drone that navigates to one or more additional mission actions (e.g., inside a chimney or vessel, etc.), to inspect structure(s) of the industrial facility 130. The one or more mission actions that the first robot 111 navigates to, as well as the one or more additional mission actions that the second robot 112 navigates to, can each be defined (e.g., by a human operator) with metadata including, for instance, a robot pose of a corresponding robot at a mission action and/or other information (e.g., camera parameters, POI parameters, etc.) associated with the mission action. Optionally, the one or more mission actions and the one or more additional mission actions may form all mission actions predefined for the industrial facility 130, for example, when the first robot 111 and the second robot 112 are the only robots deployed for the industrial facility 130 and no other mission actions are defined by human operators for the industrial facility 130.

The first robot 111, or the second robot 112, can be other types of robot(s), such as a robot to transport supplies and product, a robot dog to patrol and monitor the industrial facility for anomalies, a spider robot to inspect outside pipelines, a snake robot to inspect inside pipeline, etc. Descriptions for specific types and functions of the first robot 111, the second robot 112, or any other applicable robot are not limited herein. For instance, in some implementations, the first robot 111 (or the second robot 112) can be a real robot, and the industrial facility 130 can be an actual industrial facility. In some other implementations, the first robot 111 (or the second robot 112) can be a simulated robot that is controlled in a simulation of the industrial facility 130, where the simulated robot(s) can be utilized by a human operator to define the one or more mission actions (and/or the one or more additional mission actions).

In some implementations, the first robot 111 and the second robot 112 can each include one or more sensors for performing one or more missions. For instance, the first robot 111 (or other robot such as the second robot 112) can include (or otherwise be equipped with) a light Detection and Ranging (Lidar) sensor to image objects by producing a 3D model for the imaged objects. Additionally or alternatively, the first robot 111 (or other robot) can include other sensors such as a vision sensor, ultrasonic testing immersion transducers for detecting surface irregularities and flaws (e.g., corrosion), one or more gas sensors for detecting presence and concentration of hazardous gasses or vapors, and/or a temperature sensor for measuring temperatures, etc. The vision sensor may be a monographic camera, a stereographic camera, a thermal camera, or any other applicable vision sensor, to capture one or more images of one or more particular POIs of the industrial facility 130. The vision sensor may be removably coupled to, or be integrated into, the first robot 111. In some implementations, the vision sensor may change location and/or orientation with respect to the first robot 111, for example, by rotation or other movement. As a non-limiting example, the first robot 111 can include front and rear high-definition cameras removable coupled to the first robot 111.

In various implementations, the example environment 100 may include a map 140 for an industrial environment (sometimes referred to as "industrial environment map"), where the industrial environment map 140 may be rendered as or at a map interface via a display of the client device 103-A (or of the client device 103-B, or of other devices such as the server device 105). The industrial environment map 140 can be, for instance, a two-dimensional view (e.g., birds eye view, or overhead map) of the industrial facility 130.

The client device 103-A or 103-B may each include input device(s) and/or output device(s) for user interaction with the industrial environment map 140. For instance, a user input via an input device of the client device 103-B may cause all available mission actions (or a portion thereof) to be rendered at the industrial environment map 140, or cause all available mission actions (or a portion thereof) to be removed from appearing on or over the industrial environment map 140.

A mission action for the industrial facility 130 can, for instance, be initially defined by a human operator that controls a robot (e.g., the first robot 111), e.g., through use of a handheld controller (and/or a computer interface). The mission action can be a robot mission action to which a robot navigates, in order to observe a POI or to perform another action (e.g., measurement). The mission action can correspond, for instance, to a location where a POI (e.g., equipment, etc.) of the industrial facility 130 situates, a location where routine maintenance or inspection is expected, a location where information needs to be collected (e.g., a location where readings of a pressure gauge need to be collected/determined), or a location where anomaly is identified. After the mission action is initially defined, a robot can utilize the defined mission action (e.g., the robot pose defined in metadata associated with the mission action) to autonomously navigate to the mission action (e.g., without requiring any control from a human operator).

In some implementations, the human operator may initially define the mission action by providing input(s) to specify the mission action. For instance, the human operator may provide user interface input that specifies an ID number of the mission action, one or more robots to use at the mission action (e.g., a particular robot to inspect a surrounding environment at the mission action), robot pose(s) of the one or more robots at the mission action (e.g., to inspect an object observable from the mission action), one or more camera poses (in association with one of the robot pose(s)) for a camera of the particular robot to capture images of the object at the mission action, and/or any applicable information. In some implementations, the user interface input can be stored as metadata in association with the mission action. In some implementations, the user interface input can be processed to generate metadata in association with the mission action. For instance, the metadata of the mission action can be stored as an entry for the mission action in a mission action database (see FIG. 1B as an example).

In some implementations, metadata of a mission action can include a robot pose (for a robot) associated with the mission action. In some implementations, additionally or alternatively, the metadata of a mission action can include one or more camera parameters for a camera of the robot. The one or more camera parameters for the camera of the robot can include, for instance, a camera pose (e.g., at which the camera of the robot captures desired images of the mission action), a zoom level (e.g., of the camera for capturing the desired images at the mission action), and/or a focus (e.g., of the camera for capturing the desired images). In some implementations, additionally or alternatively, the metadata of a mission action can include one or more POI parameters for a POI (or more than one POI) sensed at the mission action. The one or more POI parameters, for instance, can include a type (e.g., sensor) of the POI and/or an identifier of the POI.

In some implementations, a mission action can be defined or updated to have varying levels of granularity. In some implementations, different mission actions may be defined or associated with different sets of metadata, where the different sets of metadata can have different levels of granularity. For instance, a mission action, when defined for capturing an image of a gauge, can be defined with both: (a) a robot pose (e.g., X, Y, Z coordinate and optionally rotation and/or translation); and (b) camera parameter(s) such as a camera pose (e.g., rotation and/or translation), a camera zoom level, and/or a camera focus setting. An additional mission action, when defined/used for capturing a gas reading, can be defined with only (a) a robot pose and not define any camera parameter(s). The mission action (or the additional mission action) can optionally or additionally be defined with POI parameter(s) that define feature(s) of POI(s) that are captured by sensor reading(s) at the mission action. For example, the mission action defined for capturing readings of a particular gauge can include metadata that defines a type of the gauge (e.g., temperature type, pressure type, etc.) and/or a unique identifier of the gauge (e.g., X1234AB).

As another example, a first mission action defined for capturing an image of a gauge can be defined with both: (a) a robot pose (e.g., X, Y, Z coordinate and optionally rotation and/or translation); and (b) camera parameter(s) such as a camera pose (e.g., rotation and/or translation), a camera zoom level, and/or a camera focus setting. In this example, a second mission action defined for capturing a gas reading can be defined with only (a) a robot pose and not define any camera parameter(s). Put another way, some mission action(s) can be defined more granularly (e.g., with robot pose and camera parameter(s)) than are other mission action(s) (e.g., robot pose only). In some implementations, metadata of the first and/or second mission action can alternatively or additionally include, for instance, POI parameter(s) that define feature(s) of POI(s) that are captured by sensor reading(s) at the first or second mission action.

In various implementations, the example environment 100 may further include a server computing device 105 (can be simply referred to as "server device"). The server computing device 105 may include a mission action (M.A.) selection engine 1051, a rendering engine 1053, and/or a storage 15. In some implementations, optionally, the server computing device 105 can include a mission action defining engine 1054. In some implementations, the industrial environment map 140 can be stored at and/or accessible via the storage 15. In some implementations, optionally, the example environment 100 may include more than one industrial environment map (e.g., industrial environment maps determined at different years, etc.).

In various implementations, the mission action defining engine 1054 can define one or more mission actions for the industrial facility. In some implementations, the mission action defining engine 1054 can determine one or more mission actions for the industrial facility based on user input, and/or can determine metadata associated with the one or more mission actions. As a non-limiting example, the mission action defining engine 1054 can determine one or more mission actions for the industrial facility 130 based on user input(s) that provide one or more defined robot missions. For instance, the user input(s) can provide a first robot mission describing a first set of mission actions for a robot (e.g., the first robot 111 or a simulated robot of the first robot 111) to navigate to, and can provide a second robot mission describing a second set of mission actions for a robot (e.g., the first robot 111 or the second robot 112, or a simulated robot of the first or second robot) to navigate to. The robot can then navigate to perform the first robot mission and/or the second robot mission.

For instance, the robot (e.g., the first robot 111) can be controlled to a first mission action that belongs to the first set of mission actions, to observe a surrounding environment of the first mission action. The robot may detect a gauge at the first mission action and a camera of the robot can be controlled to capture a particular image of the gauge with appropriate camera parameters (e.g., a particular camera pose, a zoom level, etc.). In this case, the mission action defining engine 1054 can receive values of those camera parameters from the robot and include these values of the camera parameters in the metadata associated with the first mission action. The mission action defining engine 1054 may alternatively or additionally receive a type and/or an ID of the gauge (or other POI) based on user input provided by a human operator that observes the particular image.

Continuing with the above non-limiting example, the user input from a human operator can specify a particular robot (e.g., model, manufacturer, type, function, etc.) to navigate to the mission action, a robot pose of the particular robot for the particular robot to perform one or more actions (e.g., image-capturing, repairing, etc.) at the mission action, and/or a sensor pose of a sensor carried by the particular robot when the particular robot is at the robot pose, etc. In this case, the particular robot (e.g., model, manufacturer, type, function, etc.), the robot pose of the particular robot, and/or the sensor pose of the sensor can be determined and/or stored as metadata of the mission action.

In some implementations, after the mission action defining engine 1054 defines and/or stores a plurality of mission actions for the industrial facility 130, the rendering engine 1053 can render the plurality of mission actions (e.g., as an overlay) on or over the industrial environment map 140. The rendering engine 1053 can render different mission actions from the plurality of mission actions in different manners. In some implementations, the rendering engine 1053 can render the mission actions in dependence on granularity with which each mission action is defined (as reflected by metadata of the mission actions). For example, mission actions that are defined with only a robot pose can be rendered in a unique manner relative to mission actions that are defined with both robot poses and camera parameters. As another example, mission actions that pertain to pressure sensor readings can be rendered in a unique manner relative to mission actions that pertain to temperature sensor readings, and both can be rendered in a unique manner relative to mission actions that pertain to gas sensor readings. As yet another example, which mission actions are rendered at a given time can be selected based on user input(s) (e.g., selection of a filter element) and/or based on detecting certain event(s). For instance, only a subset of mission actions can be rendered at the given time based on user input(s) that specify feature(s) of the subset of mission actions and/or based on detecting a certain event, and determining that the certain event pertains to the feature(s) of the subset of mission actions.

As a particular example, the rendering engine 1053 can render mission actions that are defined with a robot pose only on the industrial environment map 140 in a first manner, and render mission actions that are defined with a robot pose and camera parameter(s) on the industrial environment map 140 in a second manner (e.g., w/image(s) and/or descriptor(s) of gauge(s) and/or other POI(s) captured at the mission action). This can enable a human operator to more quickly ascertain a mission action to add to a given mission or to include in a new mission. For example, if the mission action is to be added to collect an additional gas reading or an additional panoramic image, then camera parameter(s) are not important, and the operator can choose from any of the rendered mission actions. On the other hand, if the mission action is to be added to collect an additional gauge reading or an additional image of a particular POI (or particular type of POI), the operator can focus their attention on mission actions with camera parameter(s).

As another particular example, an operator can select a filter element to cause all mission actions to be shown, or detection of a potential gas leak can automatically cause all mission actions to be shown (since any of the mission actions can be used to take a gas reading). On the other hand, an operator can select an alternative filter element, and the mission action selection engine 1051 can cause, based on the selected alternative filter element, only mission actions with camera parameter(s) and/or associated with only certain types of POI(s) (e.g., gauges) to be shown. In some implementations, detection of a certain event can automatically cause the mission action selection engine 1051 to selectively render one or more mission actions on the industrial environment map 140. For example, referring to FIG. 1A, in response to an industrial system 161 (symbolized by a solid rectangular as shown, which can be, for instance, a cooling system, or a pipe system having its pressure measured at one or more locations, etc.) operating sub optimally (e.g., unusual pressure), an operator can select filter element(s) to cause rendering of only mission actions (e.g., a mission action 163, a mission action 165, and a mission action 167, as shown in FIG. 1A) that (i) define a robot pose and a camera pose; and (ii) are associated with a particular type of gauge (e.g., pressure gauge in case of unusual pressure, thermometer in case of unusual temperature, etc.). This can enable the operator to quickly select, from all available or defined mission actions (e.g., mission action 163, mission action 165, and mission action 167), one or more of the mission actions to add to a given mission or to include in a new mission. For instance, the operator may add all mission action 163, mission action 165, and mission action 167 to create a new mission for a robot (e.g., the first robot 111) that carries a vision sensor, so that the robot can navigate to mission action 163, 165, and 167, respectively, to take images of pressure gauges at robot poses indicated by metadata associated with each of mission action 163, 165, and 167, using the vision sensors at camera poses indicated by the metadata associated with mission action 163, 165, and 167.

In the example above, the operator may want to inspect a particular portion of the system 161 (e.g., by providing a user-defined area 162, shown in the dashed rectangular), and the rendering engine 1053 can render only the mission action 163 and the mission action 165 that are defined with a robot pose and a camera pose, that are associated with the gauge(s), and that are within the user-defined area 162. In this example, a user may select, for instance, the mission action 163, from the rendered mission action 163 and the additional mission action 165. Such selection of the mission action 163 may cause, for instance, the first robot 111 to navigate to a robot pose associated with the mission action 163 autonomously, for performing a mission (e.g., further inspection, etc.)

In some implementations, a graphical representation of the mission action 163, the mission action 165, and/or the mission action 167 can have a particular shape, color, pattern, or other characteristics. For instance, the mission action 163, the mission action 165, and/or the mission action 167 can each have a triangle shape based on all of them being defined with a robot pose, a camera pose, and parameters of a particular gauge (e.g., a pressure gauge). The graphical representation of the mission action 163 (or 165, or 167) can be selectable, and when selected or dragged, can cause the mission action 163 (or 165, or 167) to be added to a mission.

In some implementations, optionally, as shown in FIG. 1A, a graphical representation of the mission action 165 can include, for instance, an additional selectable element 1651 which, when selected, causes an image (or other graphical representation) and/or other information (gauge ID such as ID_555, and/or a most recently acquired/recorded reading) of the particular gauge 1653 to be rendered/popped up. In some implementations, the graphical representation of the mission action 165 can include, alternatively or additionally, a further selectable element that is associated with the graphical representation of the mission action 165, where the further selectable element (not shown) when selected, may provide additional information such as the robot pose of a robot, an image or representation of the robot, a model and/or manufacturer of the robot, a camera pose and a type of a camera of the robot, an image of the camera, etc. The descriptions of the specific configuration (e.g., shape, color, pattern, POIs, etc.) for each of the mission actions (e.g., mission action 163, 165, 167, etc.) are not intended to be limiting.

Accordingly, implementations disclosed herein render mission action(s), of an industrial facility, in a map of the industrial facility. The mission action, for instance, can be rendered in manners that are in dependence on metadata associated with the mission actions. This can enable a human operator to identify, with reduced latency and/or a reduced quantity of user inputs, mission action(s) for adding to a given mission and/or for including in a new mission.

In some implementations, the example environment 100 may further include one or more additional POIs. For instance, the example environment 100 may include a robot control/simulate engine 1052 configured to control or simulate one or more mobile robots (e.g., the first robot 111). For instance, the robot control/simulate engine 1052 may cause a simulated robot to be rendered in a simulation of the industrial environment map 140, and a human operator may define a robot mission for the simulated robot that includes a plurality of defined mission actions for the simulated robot (or a corresponding real robot) to perform one or more actions, respectively.

FIG. 1B depicts a non-limiting example of storage of metadata associated with one or more mission actions, in accordance with various implementations. As shown in FIG. 1B, a mission action database 151 can be generated and stored (e.g., within the storage 15), where the mission action database 151 can include one or more entries each for a respective mission action, out of the one or more mission actions defined for an industrial facility (e.g., the industrial facility 130). For instance, the one or more entries can include a first entry 1511 for a first mission action, a second entry 1512 for a second mission action, and a third entry 1513 for a third mission action. The first entry 1511 can include metadata associated with the first mission action, which include, for instance, one or more robot parameters of a robot to navigate to the first mission action, where the one or more robot parameters include a robot type (e.g., robot dog), a robot ID (e.g., robot dog_1111), a robot pose (X1, Y1, Z1, $\alpha$1, $\beta$1, $\gamma$1), a robot mission that includes the first mission action (e.g., mission_1), and/or other robot information. The first entry 1511 can further include one or more camera parameters of a camera carried by the robot, where the one or more camera parameters include, for instance, a camera pose $(X_1, Y_1, Z_1, \alpha_1, \beta_1, \gamma_1)$, a zoom level (2×), a focus setting (single autofocus mode), and/or other camera information. The first entry 1511 can further include one or more POI parameters for a POI sensed or fixed at the first mission action. When the POI is a sensor at the first mission action, the one or more POI parameters can include, for instance, a sensor type (e.g., vision sensor, thermal sensor, pressure sensor, etc.), and a sensor ID (e.g., vision sensor_1111). The first entry 1511 may or may not include other information.

The second entry 1512 can include metadata associated with the second mission action, which include, for instance, one or more robot parameters such as a robot type (e.g., drone), a robot ID (e.g., drone_1112), a robot mission that includes the second mission action (e.g., mission_2), and a robot pose (X2, Y2, Z2, $\alpha$2, $\beta$2, $\gamma$2). The second entry 1512 can further include one or more camera parameters including, for instance, a camera pose $(X_2, Y_2, Z_2, \alpha_2, \beta_2, \gamma_2)$, a zoom level (e.g., 1×), and/or a focus setting (e.g., continuous autofocus mode). In some implementations, the second entry 1512 may or may not include information other than value(s) for the one or more robot parameters, and value(s) for the one or more camera parameters.

The third entry 1513 can include metadata associated with the third mission action, which include, for instance, one or more robot parameters such as a robot pose (X3, Y3, Z3, $\alpha$3, $\beta$3, $\gamma$3), a robot type (e.g., a crawler robot), a robot ID (e.g., crawler robot_1113), and a robot mission that includes the third mission action (e.g., mission_3). The third entry 1513 may or may not include other information than value(s) for the one or more robot parameters.

As shown in FIG. 1B, the first mission action and the second mission action can be defined with different levels of granularity. The first mission action and the third mission action can be defined with different levels of granularity. The second mission action and the third mission action can be defined with different levels of granularity. Put another way, different mission actions can be defined with different levels of granularity.

While the mission action database 151 in FIG. 1B is shown to store the first entry 1511 for the first mission action, the second entry 1512, and the third entry 1513, separately, descriptions of the mission action database 151 is limited thereto. For instance, the mission action database 151 can store and divide entries based on robot missions. For instance, the mission action database 151 can include a first set of entries each corresponding to a mission action from a first robot mission performed by a first robot (simulated or real robot), a second set of entries each corresponding to a mission action from a second robot mission performed by a second robot (simulated or real robot), . . . , and a Nth set of entries each corresponding to a mission action from a Nth robot mission performed by a Nth robot (simulated or real robot).

In some implementations, as a non-limiting example, one or more mission actions (e.g., the first mission action and only the first mission action) can be selectively rendered (e.g., on the industrial environment map 140) in dependence on granularity with which the one or more mission action are defined (as reflected by metadata of the mission actions). For instance, a user may select a filter element that filters out any mission action defined without POI parameter(s) for a particular gauge (e.g., pressure gauge). In this case, the second mission action and third mission action shown in FIG. 1B will be filtered out and not be rendered, e.g., on the industrial map 140, while the first mission action may or may not be rendered depending on whether the metadata as shown in the first entry 1511 includes any values of the POI parameters indicating that a pressure gauge is sensed or fixed at the first mission action. It is noted that the format of the mission action database 151 is not limited to format(s) illustrated in FIG. 1B, and FIG. 1B is shown for the only purpose of illustration.

Figure 2A:
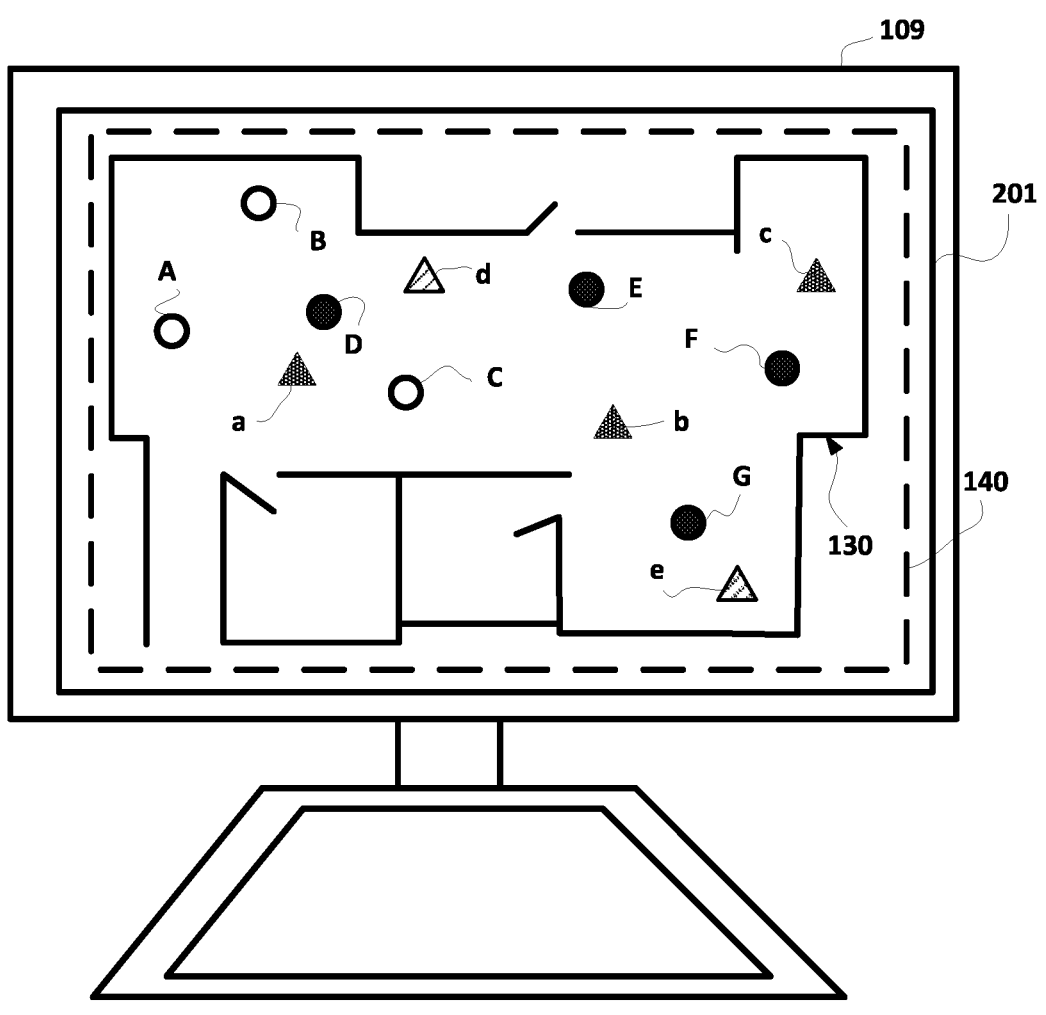
FIG. 2A depicts an example user interface showing a map rendered with all available mission actions, in accordance with various implementations.

FIG. 2A depicts a non-limiting example of a user interface 201 of a computing device 109 that shows a map rendered with all available mission actions, in accordance with various implementations. As shown in FIG. 2A, a plurality of mission actions (e.g., mission action_A, mission action_B, mission action_C, mission action_D, mission action_E, mission action_F, mission action_G) can be predefined for a first robot mission and can be rendered in a first manner (e.g., represented by a graphical representation having a round shape), and an additional plurality of mission actions (e.g., mission action_a, mission action_b, mission action_c, mission action_d, and mission action_e) can be predefined for a second robot mission and can be rendered in a second manner (e.g., represented by a graphical representation having a triangle shape) that differs from the first manner. In some implementations, the plurality of mission actions (mission action_A-G) and the additional plurality of mission actions (mission action_a-mission action_e) may together form all defined/available mission actions for the industrial facility 130, but this is not required.

In some implementations, the mission actions (i.e., mission action_A-mission action_G) can be rendered in the first manner based on metadata of such mission actions being defined in a first level of granularity, and the mission actions (i.e., mission action_a-mission action_e) can be rendered in the second manner based on metadata of such mission actions being defined in a second level of granularity. The first level of granularity can be, for instance, higher or finer than the second level of granularity. For instance, the metadata of mission action_A-mission action_G can be in the first level of granularity, by including a robot pose for each of the mission action_A-mission action_G and including one or more camera parameters (which may define, for instance, a camera pose, a zoom level, and/or a camera focus setting). For instance, the metadata of mission action_a-mission action_e can be in the second level of granularity, by including a robot pose for each of the mission action_A-mission action_G and including no camera parameter (e.g., camera pose).

As a non-limiting example, metadata of a mission action (i.e., mission action_A) can include a first robot pose (location and/or orientation) for a first robot associated with mission action_A and can include a first camera pose of a first camera carried by the first robot (e.g., to capture images of mission action_A). Such metadata of mission action_A can, for instance, be collected and/or defined based on a previous instance where the first robot was previously dispatched at the first robot pose and having the first camera positioned at the first camera pose to capture images of mission action_A.

As a non-limiting example, metadata of a mission action (i.e., mission action_a) can include a second robot pose (location and/or orientation) for a second robot associated with mission action_a and can include no camera parameter. Such metadata of mission action_a can, for instance, be collected and/or defined based on a previous instance where the second robot was previously dispatched at the second robot pose. The second robot can be the same as, or different from, the first robot.

In some implementations, as a non-limiting example, while graphical representations for mission action_A-mission action_G are all rendered to have a round shape, some graphical representations (e.g., of mission action_A, mission action_B, mission action_C) may have a different color or pattern than other graphical representations (e.g., of mission action_D, mission action_E, mission action_F, mission action_G). The graphical representations for mission action_A-mission action_C on the industrial environment map 140 may have a round shape based on the metadata of each of mission action_A-mission action_C including both a robot pose and a camera pose, and such graphical representations may have a first color or a first patten based on the metadata of each of mission action_A-mission action_C including one or more POI parameters (that define one or more features of a POI sensed at the mission action). The graphical representations for mission action_D-mission action_G on the industrial environment map 140 may have a round shape based on the metadata of each of mission action_D-mission action_G including both a robot pose and a camera pose, and such graphical representations may have a second color (e.g., different from the first color) or a second patten (e.g., different from the first pattern) based on the metadata of each of mission action_D-mission action_G including no POI parameters. The POI, for instance, can be a gauge (or an equipment, or other POI) fixed at the mission action.

Put another way, a graphical representation for mission action_A (mission action_B, or mission action_C) can be round, and can have a first color or a first pattern based on the metadata including one or more POI parameters for a POI at mission action_A, in addition to including a robot pose and one or more camera parameters. The POI can be a sensor identified or detected (e.g., by the first camera carried by the first robot) at mission action_A, and the one or more POI parameters can include a type of the POI (e.g., thermal sensor, pressure sensor, etc.) and/or an identifier of the POI. A graphical representation for mission action_D (mission action_E, mission action_F, or mission action_G) can be round, and can have a second color or a second pattern based on the metadata including no POI parameter, as no industrial POI is identified at mission action_D (which can be a location of an open space).

In some implementations, as a non-limiting example, while graphical representations for mission action_a-mission action_e are all rendered to have a triangle shape, some graphical representations (e.g., of mission action_a, mission action_b, mission action_c) may have a different color (or pattern) than other graphical representations (e.g., of mission action_d, mission action_e). The graphical representations for mission action_a-mission action_c on the industrial environment map 140 may have a triangle shape based on the metadata of each of mission action_a-mission action_c including a robot pose but no camera pose, and such graphical representations may have the color or the first patten based on the metadata of each of mission action_a-mission action_c including one or more POI parameters (that define one or more features of a POI sensed at the mission action). The graphical representations for mission action_d-mission action_e on the industrial environment map 140 may have a triangle shape based on the metadata of each of mission action_d-mission action_e including a robot pose and no camera pose, and such graphical representations may have the second color or the second patten based on the metadata of each of mission action_D-mission action_G including no POI parameters.

To put another way, a graphical representation for mission action_a (mission action_b, or mission action_c) can be triangle, and can have the first color or the first pattern based on the metadata including one or more POI parameters for a POI at mission action_A, in addition to including a robot pose and one or more camera parameters. The POI can be, for instance, a sensor (or other POI such as pipe, equipment, etc.) identified or detected (e.g., by the first camera carried by the first robot) at mission action_a, and the one or more POI parameters can include a type of the POI (e.g., thermal sensor, pressure sensor, pipe, etc.) and/or an identifier (e.g., 123E5) of the POI. As a non-limiting example, a graphical representation for mission action_d (or mission action_e) can be triangle, and can have the second color or the second pattern based on the metadata including no POI parameter, as no industrial POI is identified at mission action_d.

It is noted that, in some implementations, graphical representations of mission actions defined with camera parameters on the industrial environment map 140 can be visually different/distinguishable from graphical representations of mission actions defined without camera parameters. In some implementations, graphical representations of mission actions defined with one or more POI parameters on the industrial environment map 140 can be visually different from graphical representations of mission actions defined without any POI parameter. Optionally, graphical representations of mission actions defined with one or more POI parameters of a first POI on the industrial environment map 140 can be visually different from graphical representations of mission actions defined with one or more POI parameters of a second POI different from the first POI.

Figure 2B:
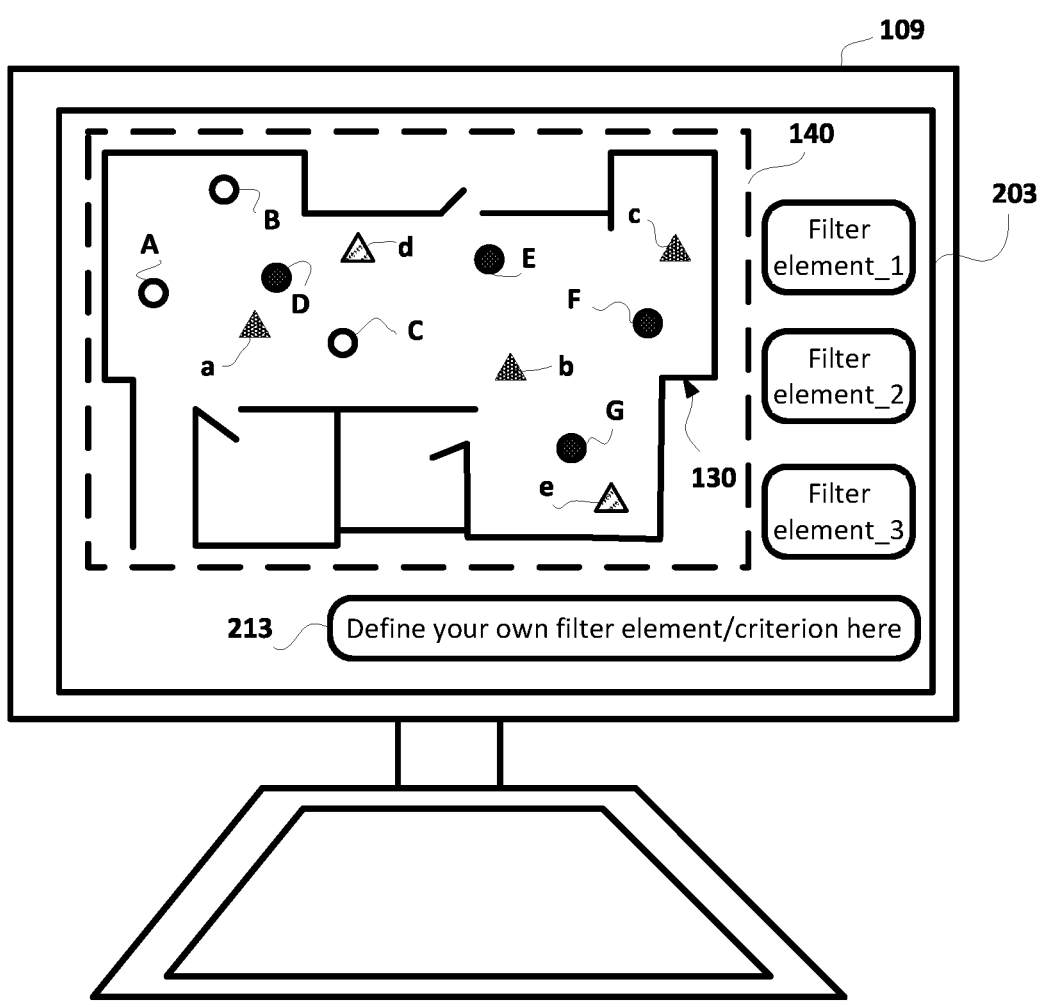
FIG. 2B depicts another example user interface showing a map rendered with all available mission actions, in accordance with various implementations.

FIG. 2B depicts a non-limiting example of a user interface 203 that shows a map rendered with all available mission actions, in accordance with various implementations. As shown in FIG. 2B, the user interface 203 can include one or more filter elements (e.g., each corresponding to a filter criterion as described previously) rendered at the user interface 203, along with the map 140 at which mission actions (e.g., mission action_A-mission action_G, mission action_a-mission action_e) are rendered. The map in FIG. 2B can be the same as, or different from, the map 140 in FIG. 1A. In some implementations, the one or more filter elements can include a first filter element (e.g., filter element_1), a second filter element (e.g., filter element_2), and/or a third filter element (e.g., filter element_3). In some implementations, additionally or alternatively, the one or more filter elements can include a customized filtering definition field 213 to receive user-defined filtering criteria (e.g., via typed input or audio input, etc.)

In some implementations, the filter element_1 can be, for instance, a first selectable element that, when selected, causes a first filter rule/criterion to be applied to selectively render mission action(s) that are each defined with a robot parameter that specifies a particular robot type. The filter element_2 can be, for instance, a second selectable element that, when selected, causes a second filter rule to be applied to selectively render mission action(s) that are each defined with a camera parameter. The filter element_3 can be, for instance, a third selectable element that, when selected, causes a third filter rule to be applied to selectively render mission action(s) that are each defined with a POI parameter (e.g., that specifies a particular type of sensor or gauge).

In some implementations, the filter element_1 can be configured to trigger a dropdown menu (listing multiple robot types) for a user to selectively render mission action(s) based on a robot type defined for a mission action, the filter element_2 can be configured to trigger a dropdown menu (listing value(s) for one or more camera parameters, where a "no camera parameter" option may indicate that a preference for mission action defined with no camera parameter) to selectively render mission action(s) based on camera parameter, and the filter element_3 can be configured to trigger a dropdown menu for a user to selectively render mission action(s) based on POI parameter. It is noted that the number/format of filter elements or filter factors are not limited herein, and can be any applicable number or format. For instance, one or more mission actions can be selectively rendered based on a detected event (e.g., failure of a cooling tower). In this case, the one or more mission actions defined with both a camera pose and a pressure sensor type (in metadata associated with the one or more mission actions) can be selectively rendered in the industrial environment map 140, automatically, in response to the detected event (e.g., the failure of the cooling tower) being detected.

Figure 2C:
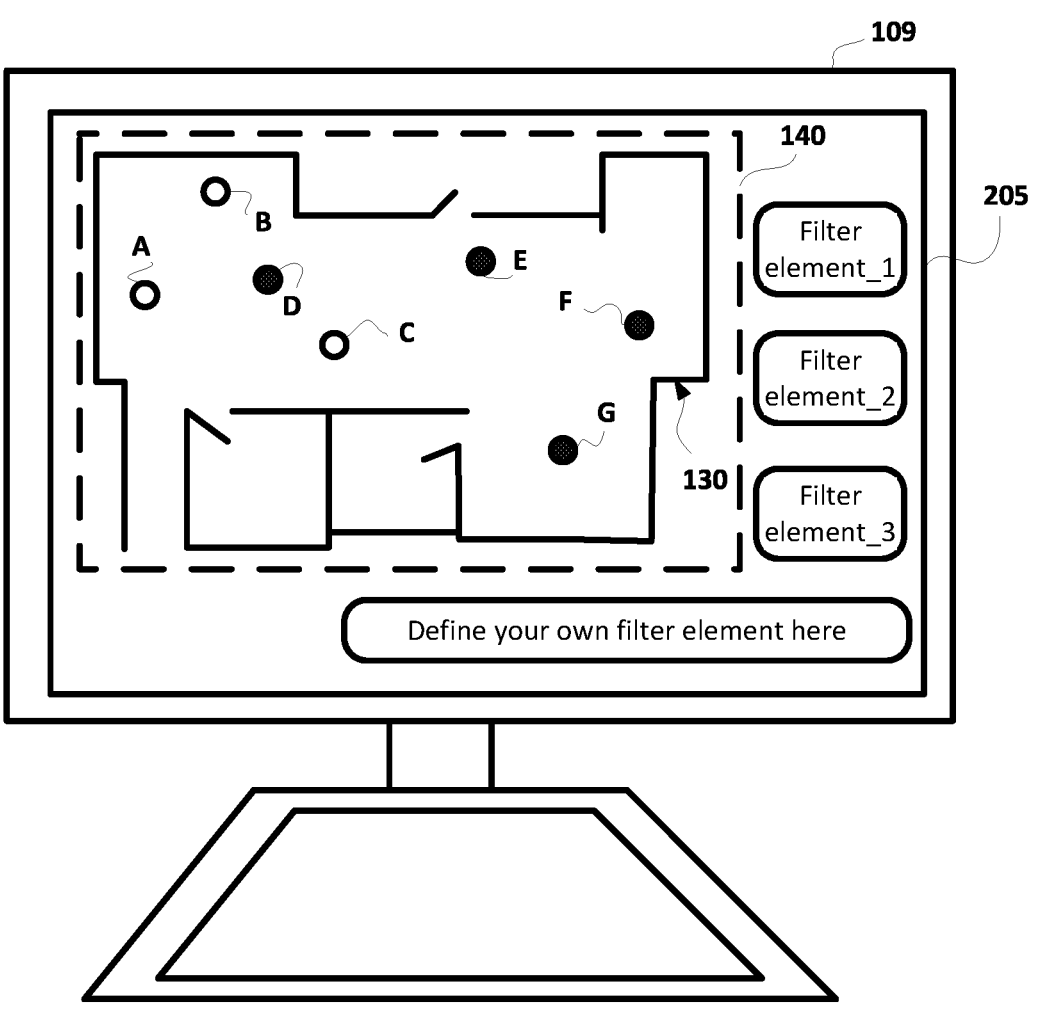
FIG. 2C depicts another example user interface showing a map rendered with one or more selected mission actions for performing selected aspects of the present disclosure, in accordance with various implementations.

FIG. 2C depicts an example user interface 205 showing a map rendered with one or more selected mission actions for performing selected aspects of the present disclosure, in accordance with various implementations. A user of the industrial environment map 140 may provide a filter parameter to selectively render mission actions defined with both a robot pose and a camera pose. In this case, as shown in FIG. 2C, mission action_A-mission action_G can be selectively rendered in response to receiving the filter parameter that is to selectively render mission actions defined with both a robot pose and a camera pose. mission action_A-mission action_G can be selected from all available mission actions (e.g., mission action_A-mission action_G, mission action_a-mission action_e) for display on the industrial environment map 140 based on each of mission action_A-mission action_G is defined with a robot pose and a camera pose, while mission action_a-mission action_e are filtered so as not be displayed based on each of mission action_a-mission action_e is not defined with a camera pose.

Figure 2D:
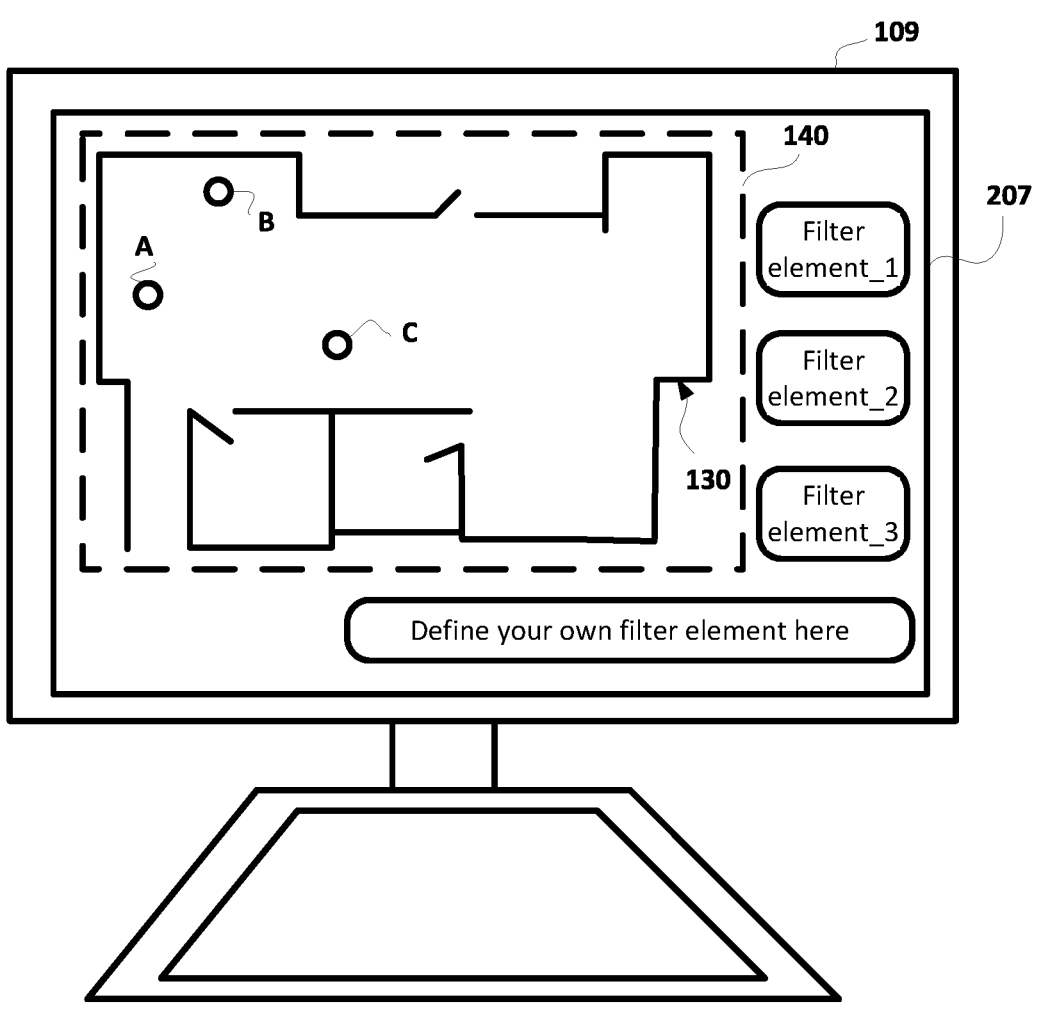
FIG. 2D depicts a further example user interface showing a map rendered with one or more selected mission actions for performing selected aspects of the present disclosure, in accordance with various implementations.

FIG. 2D depicts another example user interface 207 showing a map rendered with one or more selected mission actions for performing selected aspects of the present disclosure, in accordance with various implementations. A user of the industrial environment map 140 may provide an additional filter parameter to selectively render mission actions defined with: a robot pose, a camera pose, and a POI parameter. In this case, as shown in FIG. 2D, mission action_A-mission action_C can be selected from all available mission actions (e.g., mission action_A-mission action_G, mission action_a-mission action_e) for display on the industrial environment map 140 based on each of mission action_A-mission action_C is defined with not only a robot pose and a camera pose but also a POI parameter, while mission action_a-mission action_e and mission action_D-mission action_G are filtered out (e.g., not displayed) as each of mission action_a-mission action_e and mission action_D-mission action_G is not defined with a POI parameter.

Figure 2E:
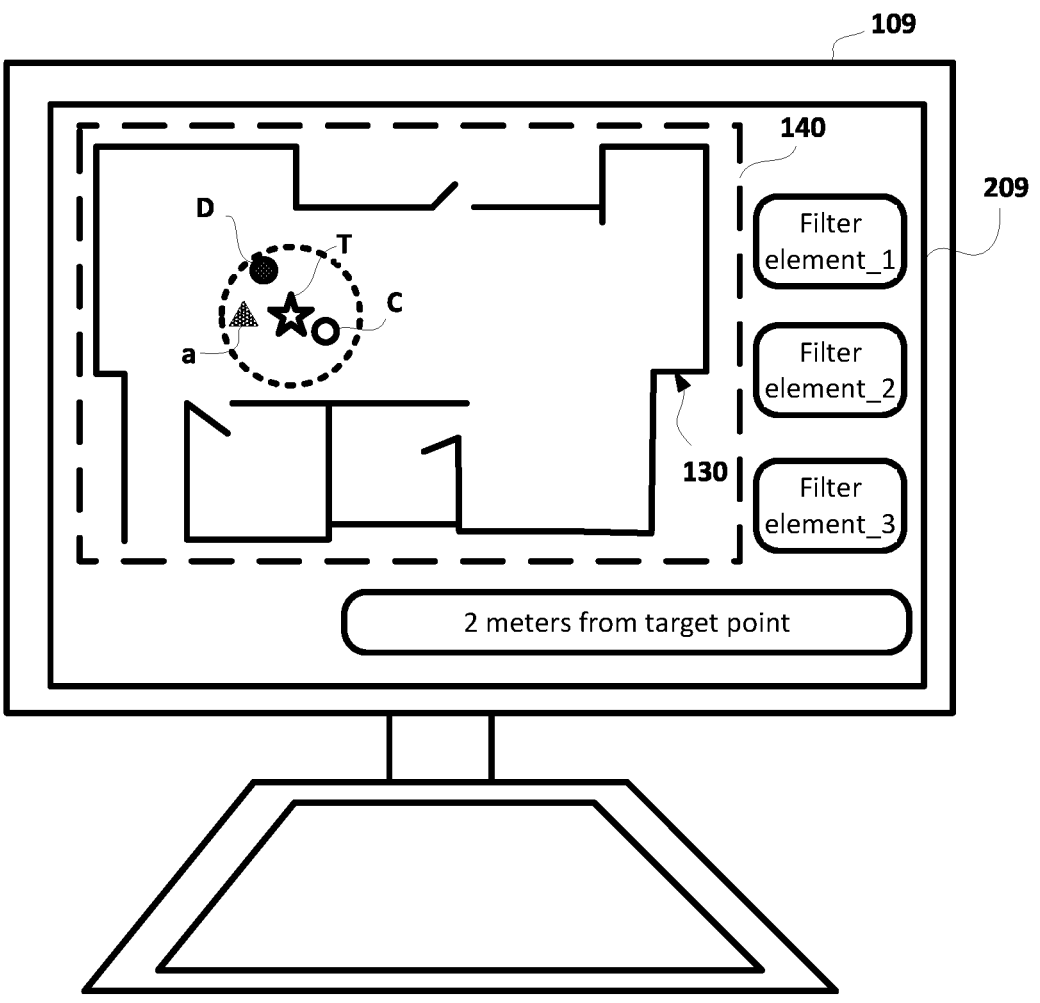
FIG. 2E depicts an additional example user interface showing a map rendered with one or more selected mission actions for performing selected aspects of the present disclosure, in accordance with various implementations.

FIG. 2E depicts a further example user interface 209 showing a map rendered with one or more selected mission actions for performing selected aspects of the present disclosure, in accordance with various implementations. In this example, as shown in FIG. 2E, one or more mission actions (e.g., mission action_a, mission action_C, mission action_D) can be selectively and automatically displayed in the industrial environment map 140 in response to a target event (e.g., an anomaly) being detected at a particular location T within the industrial facility 130.

The one or more mission actions (e.g., mission action_a, mission action_C, mission action_D) may be displayed based on a distance between the particular location T and a respective mission action (of mission action_a, mission action_C, and mission action_D) is within a predefined distance threshold (e.g., 2 m). Alternatively or additionally, one or more mission actions (e.g., mission action_C and mission action_D) may be displayed based on metadata associated with each of the one or more mission actions specifying a robot pose and a camera pose. Alternatively or additionally, one or more mission actions (e.g., mission action_C and mission action_D) may be displayed based on user input, where the user input, for instance, can modify the predefined distance threshold (e.g., from 1.0 m to 0.5 m).

Figure 2F:
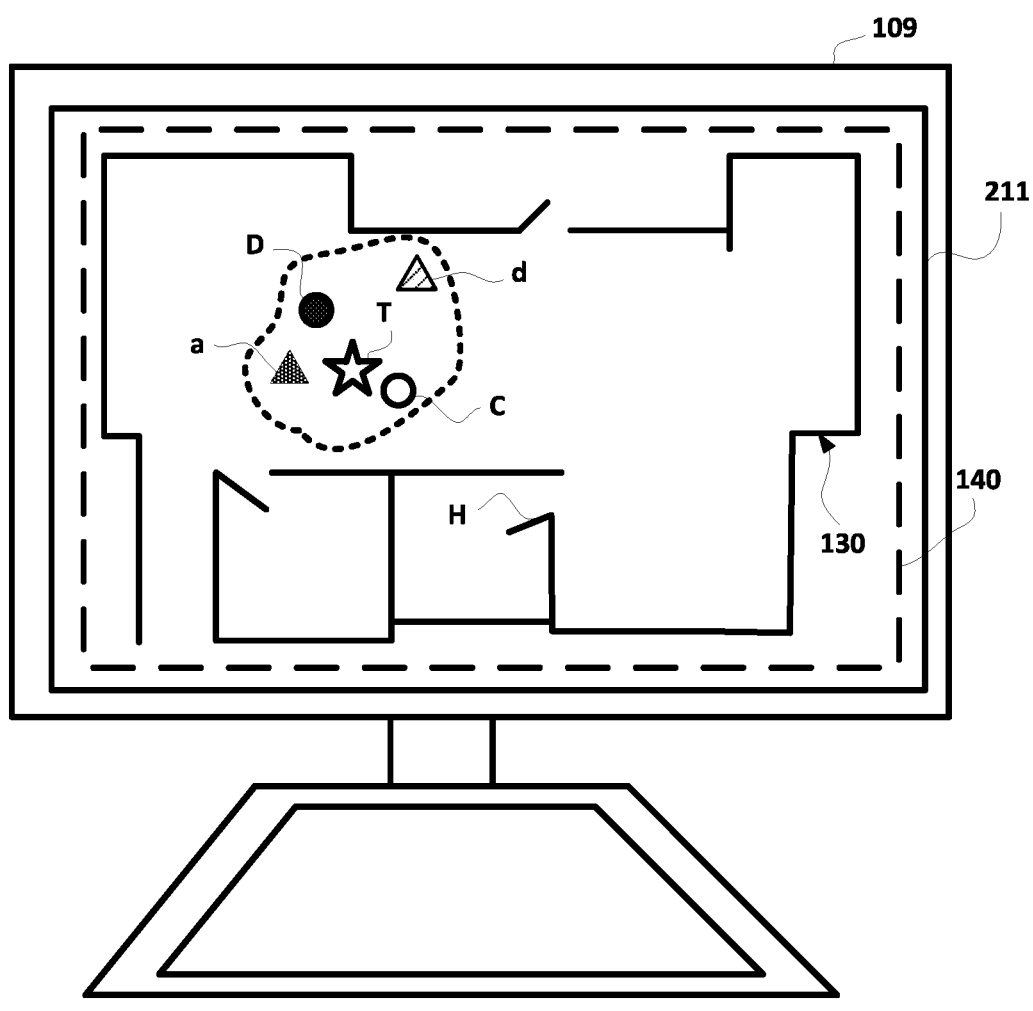
FIG. 2F depicts a further example user interface showing a map rendered with one or more selected mission actions for performing selected aspects of the present disclosure, in accordance with various implementations.

FIG. 2F depicts a further example user interface 211 showing a map rendered with one or more selected mission actions for performing selected aspects of the present disclosure, in accordance with various implementations. In this example, as shown in FIG. 2F, one or more mission actions (e.g., mission action_a, mission action_C, mission action_D, mission action_d) can be selectively displayed in the industrial environment map 140 in response to a target event (e.g., an anomaly) being detected at a particular location T within the industrial facility 130 and in response to a user defining an area (defined in dashed line in FIG. 2F) containing the particular location T. The area can be defined, for instance, via user touch at a display of a computing device 109.

FIG. 3 illustrates an example method 300 for performing selected aspects of the present disclosure, in accordance with various implementations. For convenience, the operations of the flow chart are described with reference to a system that performs the operations. This system may include various POIs of various computer systems, such as one or more POIs of the server computing device 105 (and/or additional computing devices such as the client device 103-A or 103-B). Moreover, while operations of method 300 are shown in a particular order, this is not meant to be limiting. One or more operations may be reordered, omitted or added.

In various implementations, at block 302, the system, e.g., by way of a server such as the server computing device 105, may identify corresponding metadata for each of a plurality of mission actions for an industrial environment. The industrial environment can be, or can include, an industrial facility. The industrial facility may take the form of a chemical processing plant, an industrial office environment, an oil or natural gas refinery, a catalyst factory, a manufacturing facility, an offshore oil platform, or any other applicable facility.

In some implementations, prior to identifying the metadata for each of the plurality of mission actions, the system may determine or identify the plurality of mission actions. The plurality of mission actions can be determined, for instance, based on user input and/or data transmitted from one or more robots deployed in the industrial environment.

For example, the user input can define a first robot mission for a first robot and a second robot mission for a second robot (the same as or different from the first robot). The first robot mission includes a first mission action, a second mission action, and a third mission action defined by a human operator for the first robot to navigate to and/or perform a corresponding action. The second robot mission includes mission action_1, mission action_2, mission action_3, and mission action_4 defined by the human operator or another operator for the second robot to navigate to and/or perform a corresponding action. In this example, the first to third mission actions, mission action_1-mission action_4, and one or more additional mission actions (if available) form the plurality of mission actions predefined by human operator(s). For instance, the plurality of mission actions can include a fourth mission action determined based on data (e.g., Lidar sensor data) transmitted from a robot (e.g., carrying a Lidar sensor) that indicates detection of an object or event (e.g., oil spill or repeated leakage) by a robot at the fourth mission action. The plurality of mission actions can also be determined in other manners, and are not limited to descriptions herein. Optionally, the first, second, third mission action can be robot mission actions forming a path along which the first robot observes one or more aspects of the industrial environment, and mission action_1-mission action_4 can form a path along which the second robot observes one or more aspects of the industrial environment.

As a non-limiting example, a mission action for an industrial facility can be initially defined by a human operator controlling a robot (e.g., through use of a handheld controller and/or a computer interface) and providing input(s) to specify the mission action. Controlling of a robot can be controlling of a real robot in the actual industrial facility, or controlling a simulated robot in a simulation of the industrial facility. For example, a human operator can utilize a handheld controller to navigate a robot to a particular robot pose (including location and orientation information to configure the robot), and adjust a camera carried by the robot to a particular camera pose when the robot is at the particular robot pose (so that the camera can capture a clear image of a target object or location of interest to the human operator). In this example, the human operator can provide a user interface input to define the robot pose of the robot and the camera pose of the camera carried by the robot, as metadata for the mission action.

In the above non-limiting example, after a mission action is initially defined, the robot (or another robot of the same type and model) may utilize the defined mission action to autonomously navigate to the mission action (i.e., without requiring any human operator control from the human operator).

In some implementations, different mission actions can be defined and/or navigated to, with different levels of granularity. For example, a mission action for capturing an image of a gauge can define both: (a) a robot pose (e.g., X, Y, Z coordinate and optionally rotation and/or translation); and (b) camera parameter(s) such as a camera pose (e.g., rotation and/or translation), a camera zoom level, and/or a camera focus setting. On the other hand, a mission action for capturing a gas reading can define only (a) a robot pose and not define any camera parameter(s). A mission action can optionally or additionally be stored in associated with metadata that includes POI parameter(s) that define feature(s) of POI(s) that are captured by sensor reading(s) at the mission action. For example, a mission action for capturing readings of a particular gauge can define a type of the gauge (e.g., temperature type, pressure type, etc.) and/or a unique identifier of the gauge (e.g., X1234AB).

Put another way, metadata associated with the plurality of mission actions can have different levels of granularity for different mission actions. In some implementations, the metadata can be received or collected based on user input and/or data (e.g., Lidar sensor data, configuration data, etc.) transmitted from robot(s) associated with the mission actions. In some implementations, the metadata that defines each of the plurality of mission actions can be stored in, and accessed via, a mission action database.

In various implementations, at block 304, the system, e.g., by way of a server such as the server computing device 105, may render, in a map interface for the industrial environment, a first subset of the mission actions with first graphical features, where rendering the first subset of the mission actions with the first graphical features is in response to determining that the corresponding metadata, for each of the mission actions of the first subset, match one or more first criteria. In some implementations, the map interface is a two-dimensional view of the industrial environment.

In some implementations, determining that the corresponding metadata, for each of the mission actions of the first subset, match the one or more first criteria can include, determining that the corresponding metadata for each of the mission actions of the first subset indicate that the mission actions of the first subset include readings from a first type of sensors.

In some implementations, determining that the corresponding metadata, for each of the mission actions of the first subset, match the one or more first criteria can include, determining that the corresponding metadata for each of the mission actions of the first subset include: a corresponding robot pose for the mission action, and one or more corresponding vision sensor parameters for capturing vision data of the mission action while at the corresponding robot pose. In some implementations, the one or more corresponding vision sensor parameters can include a vision sensor pose, a vision sensor zoom level, and/or a vision sensor focus parameter associated with a vision sensor carried by a mobile robot within the industrial environment.

In some implementations, metadata for the mission actions of the first subset includes one or more POI parameters for a POI (e.g., measurement device, hazardous object, etc.) at one of the mission actions of the first subset. The one or more POI parameters can include, for instance, a POI identifier and/or a type of the POI.

In various implementations, at block 306, the system, e.g., by way of a server such as the server computing device 105, may render, in the map interface for the industrial environment and along with the first subset of the mission actions, a second subset of the mission actions with second graphical features, where rendering the second subset of the mission actions with the second graphical features is in response to determining that the corresponding metadata, for each of the mission actions of the second subset, match one or more second criteria. In some implementations, the first subset of the mission actions and the second subset of the mission actions may be rendered simultaneously. In some implementations, the first subset of the mission actions and the second subset of the mission actions may not be rendered simultaneously. The first criteria are distinct from the second criteria. The first graphical features can be visually distinct from the second graphical features. To put another way, the first subset of the mission actions and the second subset of the mission actions can be rendered in different manners (e.g., different shapes, colors, patterns, etc.), e.g., based on the first subset of the mission actions are defined with metadata having a first level of granularity and the second subset of the mission actions are defined with metadata having a second level of granularity (finer than or coarser than the first level of granularity).

In some implementations, determining that the corresponding metadata, for each of the mission actions of the second subset, match the one or more second criteria can include, determining that the corresponding metadata for each of the mission actions of the second subset indicate that the mission actions of the second subset include readings from a second type of sensors. The second type can be different from the aforementioned first type.

In some implementations, determining that the corresponding metadata, for each of the mission actions of the second subset, match the one or more second criteria can include, determining that the corresponding metadata for each of the mission actions of the second subset include a corresponding robot pose for the mission action, but lack any camera parameters for capturing an image of the mission action.

In some implementations, determining that the corresponding metadata, for each of the mission actions of the second subset, match the one or more second criteria can include, determining that the corresponding metadata for each of the mission actions of the second subset include only a corresponding robot pose for each of the mission actions of the second subset.

In various implementations, at block 308, the system, e.g., by way of a server such as the server computing device 105, may receive a selection, via the map interface for the industrial environment, of a given mission action of the first subset or the second subset. In various implementations, at block 310, the system, e.g., by way of a server such as the server computing device 105, may, in response to receiving the selection, add the given mission action to a predefined robot mission or including the given mission action in a new robot mission. The given mission action may be added to the predefined robot mission or the new robot mission automatically.

For example, the predefined robot mission can include, for instance, mission actions A-K, but not mission action L (although mission action L is defined in an alternate mission). In some implementations, the mission action L may be selected from one or more mission actions that are selectively rendered on the map interface, based on user input. In this case, there can be a desire to add mission action L to the predefined robot mission, for instance, if there is a potential hazardous condition near mission action L (e.g., that is within a predetermined distance with respect to mission action L), or if there is a potential issue with a gauge associated with mission action L, etc.

FIG. 4 illustrates another example method 400 for performing selected aspects of the present disclosure, in accordance with various implementations. For convenience, the operations of the flow chart are described with reference to a system that performs the operations. This system may include various POIs of various computer systems, such as one or more POIs of the server computing device 105 (and/or additional computing devices such as the client device 103-A or 103-B). Moreover, while operations of method 400 are shown in a particular order, this is not meant to be limiting. One or more operations may be reordered, omitted or added.

In various implementations, at block 402, the system, e.g., by way of a server such as the server computing device 105, may identify corresponding metadata for each of a plurality of mission actions for an industrial environment.

In some implementations, the corresponding metadata for each of the plurality of mission actions includes a corresponding robot pose of a respective robot at a corresponding mission action, and determining the filtering criteria includes determining one or more pose-based filtering criteria (e.g., to selectively render mission actions that are within an area containing a target location). The target location can be, for instance, a location where an anomaly (e.g., oil spill) is detected, or where maintenance is needed, etc. The area containing the target location can be defined based on user input at the map interface, or the area can be defined automatically based on a predetermined distance with respect to the target location.

In some implementations, the corresponding metadata for each of the mission actions of the subset includes one or more corresponding vision sensor parameters associated with a vision sensor to capture an image at the corresponding robot pose in association with a corresponding mission action, and wherein determining the filtering criteria includes determining one or more vision-based filtering criteria to, for instance, selectively render mission actions that are defined with a particular values (e.g., zoom level of 5×, etc.) of vision sensor parameters.

In some implementations, the metadata for each of the mission actions of the subset includes one or more POI parameters associated with a POI at a corresponding mission action. In some implementations, the one or more POI parameters include a POI identifier and/or a type of the POI.

In various implementations, at block 404, the system, e.g., by way of a server such as the server computing device 105, may determine, based on user interface input and/or based on a detected event in the industrial environment, one or more filtering criteria. In some implementations, the one or more filtering criteria include requiring the metadata for each of the mission actions of the subset to include the POI having the POI identifier or is of the type.

In various implementations, at block 406, the system, e.g., by way of a server such as the server computing device 105, may select, from the mission actions, a subset of the mission actions, where selecting the subset of the mission actions is in response to determining that the corresponding metadata, for each of the mission actions of the subset, match the one or more filtering criteria.

In various implementations, at block 408, the system, e.g., by way of a server such as the server computing device 105, may render, in a map interface for the industrial facility, the subset of the mission actions, without rendering other of the mission actions that are not of the subset.

In some implementations, the rendered subset can include a first mission action rendered with first graphical features; and a second mission action rendered with second graphical features, where the first graphical features are visually distinct from the second graphical features. In some implementations, metadata associated with the first mission action is of a higher level of granularity than is the metadata associated with the second mission action.

In various implementations, at block 410, the system, e.g., by way of a server such as the server computing device 105, may receive a selection, via the map interface for the industrial facility, of a given mission action of the subset.

In various implementations, at block 412, the system, e.g., by way of a server such as the server computing device 105, may, in response to receiving the selection, add the given mission action to a predefined robot mission or including the given mission action in a new robot mission.

Figure 5:
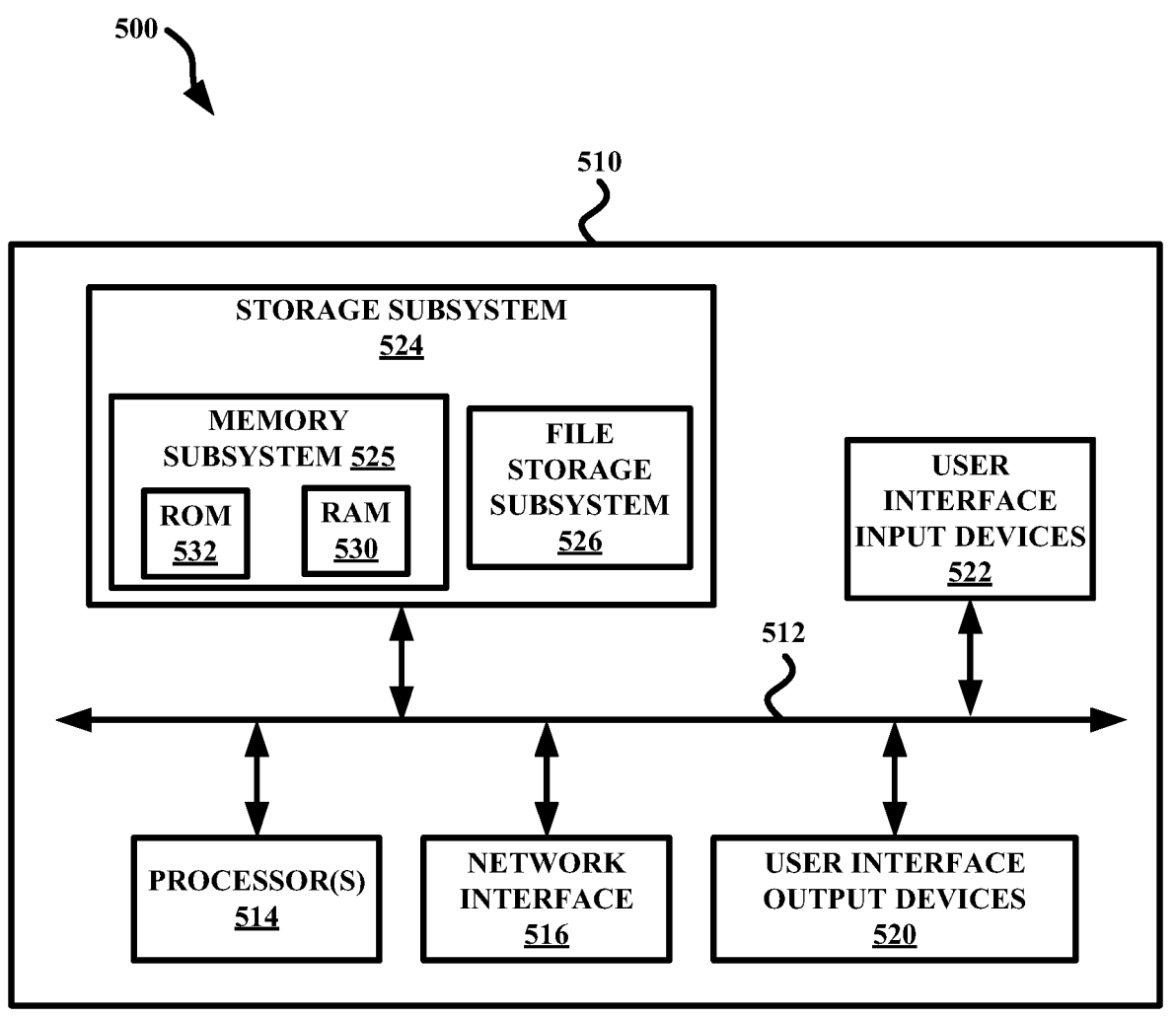
FIG. 5 schematically illustrates an example computer architecture on which selected aspects of the present disclosure may be implemented.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIG. 3 or FIG. 4 as well as, to implement various components depicted in FIG. 1.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple buses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:

identifying metadata for each of a plurality of mission actions for an industrial environment;

rendering, in a map interface for the industrial environment, a first subset of the mission actions with first graphical features, wherein rendering the first subset of the mission actions with the first graphical features is in response to determining that corresponding metadata, for each of the mission actions of the first subset, matches one or more first criteria, wherein determining that the corresponding metadata, for each of the mission actions of the first subset, matches the one or more first criteria comprises:

determining that the corresponding metadata for each of the mission actions of the first subset include a reading from a first type of sensor;

rendering, in the map interface for the industrial environment and along with the first subset of the mission actions, a second subset of the mission actions with second graphical features, wherein rendering the second subset of the mission actions with the second graphical features is in response to determining that corresponding metadata, for each of the mission actions of the second subset, matches one or more second criteria, wherein determining that the corresponding metadata, for each of the mission actions of the second subset, matches the one or more second criteria comprises:

determining that the corresponding metadata for each of the mission actions of the second subset include a reading from a second type of sensor, the second type being different from the first type, wherein the first criteria are distinct from the second criteria, and wherein the first graphical features are visually distinct from the second graphical features;

receiving a selection, via the map interface for the industrial environment, of a given mission action of the first subset or the second subset; and in response to receiving the selection, adding the given mission action to a predefined robot mission or including the given mission action in a new robot mission.

2. The method of claim 1, wherein determining that the corresponding metadata, for each of the mission actions of the first subset, match the one or more first criteria comprises:

determining that the corresponding metadata for each of the mission actions of the first subset include: a corresponding robot pose for the mission action, and one or more corresponding vision sensor parameters for capturing vision data of the mission action while at the corresponding robot pose.

3. The method of claim 2, wherein the mission actions of the first subset include a hazardous object.

4. The method of claim 2, wherein the one or more vision sensor parameters include a vision sensor pose, a vision sensor zoom level, and/or a vision sensor focus parameter associated with a vision sensor carried by a mobile robot within the industrial environment.

5. The method of claim 2, wherein metadata for each of the mission actions of the first subset further includes one or more POI parameters for a POI at a corresponding mission action, of the mission actions of the first subset.

6. The method of claim 5, wherein the one or more POI parameters include a POI identifier of the POI and/or a type of the POI.

7. The method of claim 1, wherein determining that the corresponding metadata, for each of the mission actions of the second subset, matches the one or more second criteria comprises:

determining that the corresponding metadata for each of the mission actions of the second subset includes a corresponding robot pose for the mission action, but lacks any camera parameters for capturing an image of the mission action.

8. The method of claim 7, wherein determining that the corresponding metadata, for each of the mission actions of the second subset, matches the one or more second criteria comprises:

determining that the corresponding metadata for each of the mission actions of the second subset includes only a corresponding robot pose for each of the mission actions of the second subset.

9. The method of claim 1, wherein the map interface is a two-dimensional view of the industrial environment.

10. The method of claim 1, wherein the first graphical features includes a first selectable graphical user interface (GUI) element representing a first mission action from the first subset of the mission actions, and the second graphical features includes a second selectable graphical user interface (GUI) element representing a second mission action from the second subset of the mission actions, the first selectable GUI element being different from the second selectable GUI element.

11. A method implemented by one or more processors, the method comprising:

identifying metadata for each of a plurality of mission actions for an industrial environment;

determining, based on user interface input and/or based on a detected event in the industrial environment, one or more filtering criteria;

selecting, from the mission actions, a subset of the mission actions, wherein selecting the subset of the mission actions is in response to determining that corresponding metadata, for each of the mission actions of the subset, match the one or more filtering criteria;

rendering, in a map interface for the industrial environment, the subset of the mission actions, without rendering any other mission action from the plurality of mission actions that is not of the subset;

receiving a selection, via the map interface for the industrial environment, of a given mission action of the subset; and in response to receiving the selection, adding the given mission action to a predefined robot mission or including the given mission action in a new robot mission.

12. The method of claim 11, wherein:

the metadata for each of the plurality of mission actions includes: a robot pose of a respective robot at a corresponding mission action, and the one or more filtering criteria includes: a pose-based filtering rule to selectively render mission actions that are within an area containing a target location.

13. The method of claim 12, wherein the area containing a target location is defined based on user input at the map interface, or the area is defined automatically based on a predetermined distance with respect to the target location.

14. The method of claim 12, wherein the metadata for each of the mission actions of the subset includes: one or more vision sensor parameters associated with a vision sensor to capture an image at the robot pose in association with a corresponding mission action, and the one or more filtering criteria includes: a vision-based filtering rule to selectively render mission actions of a particular type.

15. The method of claim 11, wherein the metadata for each of the mission actions of the subset includes one or more POI parameters associated with a POI at a corresponding mission action.

16. The method of claim 14, wherein the one or more POI parameters include a POI identifier of the POI and/or a type of the POI.

17. The method of claim 11, wherein rendering the subset of the mission actions comprises:

rendering a first mission action from the subset of the mission actions with first graphical features; and rendering a second mission action from the subset of the mission actions with second graphical features, wherein the first graphical features are visually distinct form the second graphical features.

18. The method of claim 17, wherein metadata associated with the first mission action is of a higher level of granularity than is the metadata associated with the second mission action.

19. A method implemented by one or more processors, the method comprising:

identifying metadata for each of a plurality of mission actions for an industrial environment, the metadata for each of the plurality of mission actions including at least a robot pose for a robot at a corresponding mission action;

detecting an object or event to be inspected within the industrial environment;

in response to detecting the object or event, rendering, in a map interface for the industrial environment, a first mission action and a second mission action, wherein rendering the first and second mission actions is in response to determining that the first and second mission actions are within a predetermined distance with respect to a location of the object or event, wherein the first mission action and the second mission action are rendered with different graphical features based on metadata of the first mission action and the second mission action having different levels of granularities; and receiving a selection, via the map interface for the industrial environment, of the first mission action or the second mission action; and in response to receiving the selection, adding the first or second mission action to a robot mission.

* * * * *